(12) United States Patent
Atkinson et al.

(10) Patent No.: US 8,197,725 B2
(45) Date of Patent: *Jun. 12, 2012

(54) THERMAL CURING METHODS AND SYSTEMS FOR FORMING CONTACT LENSES

(75) Inventors: Hayden Atkinson, Basingstoke (GB); Paul Riggs, Southampton (GB); John Gibson, Farnham Common (GB); Tim Warren, Dublin, CA (US); Ronnie Dover, Simpsonville, SC (US); Arthur Williams, Greenville, SC (US); Jennifer Cowden, Greenville, SC (US); Michael Gunner, Simpsonville, SC (US)

(73) Assignee: Coopervision International Holding Company, LP, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 12/955,787

(22) Filed: Nov. 29, 2010

(65) Prior Publication Data

US 2011/0068496 A1    Mar. 24, 2011

Related U.S. Application Data

(62) Division of application No. 12/121,404, filed on May 15, 2008, now Pat. No. 7,854,866.

(60) Provisional application No. 60/939,037, filed on May 18, 2007.

(51) Int. Cl.
*B29D 11/00* (2006.01)
*B28B 5/02* (2006.01)
(52) U.S. Cl. .......................... 264/1.32; 264/2.6
(58) Field of Classification Search ............... 264/2.7, 264/1.32, 2.6; 425/808
See application file for complete search history.

(56) References Cited

U.S. PATENT DOCUMENTS 2,273,903 A    2/1942    Smalley et al.
(Continued)

FOREIGN PATENT DOCUMENTS

JP    2001-198929 A    7/2001
(Continued)

OTHER PUBLICATIONS

International Preliminary Report on Patentability mailed Dec. 3, 2009 from corresponding International Application No. US/2008/063759, filed May 15, 2008 (8 pages).

(Continued)

*Primary Examiner* — Joseph Del Sole
*Assistant Examiner* — Kimberly A Stewart
(74) *Attorney, Agent, or Firm* — Klein, O'Neil & Singh, LLP

(57) ABSTRACT

Contact lens curing systems and methods are described. A contact lens curing system includes an oven that has a plurality of curing zones, a mold advancement system for moving the contact lens mold assemblies between the plurality of zones, and a controlled atmosphere within the curing zones that provides a substantially chemically inert environment in which contact lens precursor materials can be polymerized in contact lens mold assemblies located in the curing zones. Methods of producing contact lenses include curing contact lens precursor materials in contact lens mold assemblies in the lens curing system. As an example, an oven for curing contact precursor materials in molds, the curing process being done in an inert atmosphere, includes a plurality of heating zones, such as three heating zones 106, 107, 108 or two heating zones 307, 308 and a mold advancement system for moving the molds between the plurality of zones, wherein a first zone and second zone of the plurality of zones are maintained at different temperatures 106, 107 or 307, 308.

25 Claims, 20 Drawing Sheets

U.S. PATENT DOCUMENTS

| | | | |
|---|---|---|---|
| 4,073,577 | A | 2/1978 | Hofer |
| 4,661,573 | A | 4/1987 | Ratkowski et al. |
| 5,087,392 | A | 2/1992 | Burke et al. |
| 5,100,590 | A | 3/1992 | Ruhlin |
| 5,180,898 | A | 1/1993 | Alden et al. |
| 5,340,399 | A | 8/1994 | Uftring et al. |
| 5,656,210 | A | 8/1997 | Hill et al. |
| 5,990,450 | A | 11/1999 | Kirker et al. |
| 6,267,587 | B1 | 7/2001 | Bishop et al. |
| 6,439,870 | B1 | 8/2002 | Marceau et al. |
| 6,533,577 | B2 | 3/2003 | Anderson et al. |
| 6,933,325 | B2 | 8/2005 | Zheng et al. |
| 2004/0076919 | A1 | 4/2004 | Schwartz |
| 2004/0119176 | A1 | 6/2004 | Xia et al. |
| 2006/0275591 | A1 | 12/2006 | MacDonald et al. |
| 2007/0035051 | A1 | 2/2007 | Darnton et al. |

FOREIGN PATENT DOCUMENTS

| | | | |
|---|---|---|---|
| KR | 10-1981-0000394 | B1 | 4/1981 |
| WO | WO 02/04878 | A1 | 1/2002 |

OTHER PUBLICATIONS

International Search Report completed and mailed Oct. 27, 2008 from corresponding PCT Application No. US/2008/063759, filed May 15, 2008 (6 pages).

Written Opinion completed and mailed Oct. 27, 2008 from corresponding PCT Application No. US/2008/063759, filed May 15, 2008 (5 pages).

Office Action mailed Aug. 26, 2009 from corresponding U.S. Appl. No. 12/121,404.

Office Action mailed Dec. 18, 2009 from corresponding U.S. Appl. No. 12/121,404.

Final Office Action mailed Jul. 12, 2010 from corresponding U.S. Appl. No. 12/121,404.

Advisory Action mailed Sep. 28, 2010 fro corresponding U.S. Appl. No. 12/121,404.

Notice of Allowance mailed Nov. 5, 2010 from corresponding U.S. Appl. No. 12/121,404.

THERMAL CURING METHODS AND SYSTEMS FOR FORMING CONTACT LENSES

CROSS-REFERENCE TO RELATED APPLICATION

This is a division of application Ser. No. 12/121,404, filed May 15, 2008, which claims the benefit of U.S. provisional Application No. 60/939,037, filed May 18, 2007, the contents of which are expressly incorporated herein by reference.

FIELD

This invention relates to thermal curing methods and systems for forming contact lenses. More particularly, the present invention relates to thermal curing methods and systems for forming contact lenses in an inert atmosphere. Even more particularly, although not exclusively, the present invention relates to forming hydrogel contact lenses, and especially silicone hydrogel contact lenses, using those methods and systems.

BACKGROUND

In the production of polymer contact lenses, a polymerizable lens precursor composition is polymerized to form a contact lens product that is further processed to form a hydrated contact lens. Lenses, such as hydrogel contact lenses and silicone hydrogel contact lenses, have been made from a variety of different materials by that method. Conventional hydrogel contact lenses include contact lenses made from materials having a US Adopted Name (USAN) such as polymacon, tetrafilcon, ocufilcon, vifilcon, etafilcon, omafilcon, alphaphilcon, nelfilcon, hilafilcon, tefilcon, or vasurfilcon, for example. Frequently, conventional hydrogel contact lenses are the polymerized product of a lens precursor composition containing hydrophilic monomers, such as 2-hydroxyethylmethacrylate (HEMA), methacrylic acid (MA), methyl methacrylic acid (MMA), N-vinyl pyrrolidone (NVP), polyvinyl alcohol (PVA), polyvinyl pyrrolidone (PVP), and combinations thereof. The precursor compositions also frequently contain one or more catalysts and crosslinking agents.

Silicone hydrogel contact lenses are polymerized contact lenses that include a silicone component. For example, silicone hydrogel contact lenses can be formed by polymerizing a lens precursor composition that contains a silicone-containing monomer, oligomer, macromer, polymer, and the like, in addition to other lens forming materials. Examples of publicly available silicone hydrogel contact lenses include contact lenses formed from materials having a USAN of balafilcon A (PUREVISION, Bausch & Lomb), lotrafilcon A (NIGHT & DAY, CIBA Vision), lotrafilcon B (O2OPTIX, CIBA Vision), galyfilcon A (ACUVUE ADVANCE, Vistakon), senofilcon A (ACUVUE OASYS, Vistakon), and comfilcon A (BIOFINITY, CooperVision).

The polymerization or curing of the lens precursor composition can be accomplished by exposing contact lens mold assemblies containing the lens precursor composition to ultraviolet radiation or heat, in a curing oven for example. The type of radiation used to polymerize the precursor composition is often dependent on the chemical formulation. When a chemically inert curing process is desired so that reactive oxygen does not affect the polymerization of the precursor composition, contact lens mold assemblies are treated and/or receive the polymerizable composition under chemically inert atmospheric conditions, for example under a nitrogen blanket.

Thermal curing of the lens precursor compositions in the contact lens mold assemblies can in principle take place in a normal or non-chemically inert atmosphere since the polymerizable lens precursor composition was dispensed in a chemically inert atmosphere, but in practice, many of the contact lenses produced in a normal atmosphere are rejected for various faults, many of which arise from problems resulting from volatile materials that are produced during the polymerization.

In thermal curing procedures for hydrogel contact lenses, volatiles released from the lens precursor composition as it polymerizes become a significant issue, especially from a regulatory viewpoint. Volatile by-products of the curing accumulate within the curing oven and must be removed, either by manual cleaning (which is usually impractical as it requires use of the oven to stop to allow the cleaning) or by using scrubbing filters. For example, activated carbon filters are often used to scrub volatile by-products resulting from the curing process; however, that can cause problems as contact lens manufacture requires a very clean environment, and activated carbon filters are usually not clean. Standard condensation filters are used to remove generated moisture.

The thermal curing process can involve altering the temperature of the curing chamber or curing zone of a batch-type curing oven several times during the curing. For example, the curing chamber of the oven may be kept at a constant first temperature of X degrees for A minutes, then heated to Y degrees and kept at that temperature for B minutes, then cooled to X degrees and kept at that temperature for A minutes. The different curing temperatures and times relate to the chemical formulations used to make the contact lenses. Therefore, the actual values described above are represented by variables for purposes of convenience. Other curing profiles are also possible.

Commercial-scale contact lens production requires very large numbers (typically tens if not hundreds of thousands) of contact lenses to be produced each day. When batch ovens are used, achieving those numbers requires several batch ovens of the type described above to be operated in parallel. However, each batch oven tends to provide a slightly different thermal performance. Also, the inert environment is difficult to control in a batch oven curing process, again leading to different oven performances. Those different performances make it difficult to control the manufacturing process to minimize the fraction of contact lenses that have defects that result in them being rejected.

There remains a need for new systems and methods for producing contact lenses, including hydrogel contact lenses and especially silicone hydrogel lenses, which quickly produce large numbers of contact lenses while reducing problems associated with existing methods and systems. For example, there is a need for new systems and methods to quickly produce in a chemically inert and volatile-free atmosphere large numbers of contact lenses having improved uniformity in their properties.

SUMMARY

The present methods and systems utilize thermal radiation to polymerize lens precursor materials in contact lens mold assemblies to form polymerized molded contact lens products using a controlled atmospheric environment. A contact lens mold assembly, as used herein, refers to an assembly of a front surface mold, or female mold, and a back surface mold, or male mold, in contact with each other to form a contact lens shaped cavity, as understood by persons familiar with cast molding processes for producing contact lenses. A controlled atmospheric environment is provided in which assembled contact lens mold assemblies can be exposed to polymerizing amounts of radiation to cure amounts of a contact lens precursor composition to form polymerized contact lens products. The controlled atmospheric environment in a contact lens curing oven can control the amount of moisture present in the curing oven or a curing zone of the oven, the amount of reactive chemical groups, such as oxygen, present in the curing oven or a curing zone of the oven, or the temperature in the curing oven or a curing zone of the oven, or combinations thereof. The desired atmosphere parameters, such as moisture content, oxygen levels, and temperature can be determined empirically based on test runs of contact lenses produced in the oven.

In certain embodiments, the present methods and systems can thermally cure contact lenses in contact lens mold assemblies by controlling residual oxygen levels within a curing oven or curing zone of an oven thereby improving the quality of contact lens products so produced compared to substantially identical contact lenses produced in a thermal curing oven without such control.

In other embodiments of the present methods and systems, a curing oven is provided which has at least one curing zone having a curing atmosphere at a first pressure, and a region of the curing system has a second pressure that is greater than the first pressure of the curing atmosphere. The region with the second pressure can be provided between an external wall surrounding e curing oven, and can be understood to be a chamber between the external wall and the curing oven. The increased second pressure can be effective in providing a controlled atmospheric environment in the curing zone of the oven.

In still other embodiments of the present methods and systems, contact lenses are cured in an oven that comprises a plurality of curing zones, and a first of the plurality of curing zones is maintained at a first temperature, and a second of the plurality of curing zones is simultaneously maintained at a second temperature that is different than the first temperature.

In one embodiment of a contact lens curing system, an oven for curing contact lens precursor materials in molds to form contact lenses is described. The oven, or contact lens curing oven, comprises a source of an inert gas, which is operable to provide an inert atmosphere in the oven during the curing. The oven also comprises a plurality of zones and a contact lens mold advancement system for moving the molds between the plurality of zones. As used herein, a contact lens mold advancement system refers to a component of a curing oven that interacts with one or more mold carriers to move the mold carrier to different positions in the oven. In certain embodiments, the mold advancement system can be understood to be an indexing system. An indexing system can also keep track of information, such as product specifications of contact lenses being formed in the molds. For example, in certain embodiments, a computer system can be associated with the indexing system or the contact lens mold advancement system, and the computer system can include software that tracks data related to a particular batch of contact lenses being produced. As discussed herein, the present contact lens mold advancement systems include a portion that physically contacts mold carriers and provides a force to move the mold carrier in the oven.

The oven is operable to simultaneously maintain a first zone of the plurality of zones at a first temperature and a second zone of the plurality of zones at a second, different, temperature.

The oven is arranged such that, when used in production, heat is used to cure/polymerize the polymerizable lens precursor materials. Thermal curing of the lens precursor materials is provided under an inert atmosphere (e.g., a chemically inert atmosphere or an oxygen-free atmosphere, for example a nitrogen atmosphere). In contrast to single chamber or single zone batch ovens, in which a batch of lenses is placed in just one chamber of an oven, cured, and removed, then another batch of lenses is placed in the one chamber of the oven, cured, and removed, and so on, the present ovens are able to improve on that by providing a more "continuous" processing of the contact lenses, in a chemically inert environment.

Each zone of the oven may be a different oven chamber, the chambers being in sufficient communication with each other for the molds to be moved between them. The different oven chambers may be separate ovens, so that the entire oven or curing system can be understood to be a "super"-oven and the separate ovens can be understood to be "sub"-ovens, within the super-oven. The zones may be formed within an oven chamber, for example by using a moveable or removable wall or walls to define the zones. The wall may restrict heat flow between adjacent zones. The zones may be defined at least partially by stationary walls (that is, walls that are arranged to remain stationary during operation of the oven, but possibly removable or moveable for example during maintenance of the oven). The zone walls may be jointly defined by moveable and stationary walls.

The plurality of zones may be in gas communication with each other, so that the inert atmosphere is a single inert atmosphere, extending throughout the plurality of zones. The oven may thus provide one inert environment, in which a plurality of temperature zones are maintained simultaneously. The inert environment within the oven is separate from the atmospheric environment surrounding the oven, for example, during the curing process, there is no uncontrolled gas flow between the interior atmosphere of the oven and the exterior atmosphere of the oven.

The present curing systems or the oven may include one or more volatile material treatment components. For example, a curing system may be understood to include one or more curing ovens and one or more volatile material treatment components. The volatile material treatment components are in communication with the curing ovens to receive the volatile materials produced from the curing process. Alternatively, the volatile material treatment components may be components of the curing oven. Examples of volatile material treatment components include one or more vapor condensers, one or more organic filters, one or more oxygen scavengers, and combinations thereof. The treatment components receive a volume of gas comprising volatile by-products resulting from the curing process and treat the gas to reduce and preferably substantially remove the volatile by-products from the gas. A treatment component or components can also remove water vapor that may be present in the gas. For example, the treatment components can treat volatile by-product-containing gas so that the amount of volatile by products present in the gas is less than 100 parts per million (ppm). Thus, the treatment components may be understood to be components of a gas purification system or a gas recycle system.

In certain embodiments, the vapor condenser is a cold trap, as understood by persons of ordinary skill in the art. Thus, the vapor condenser may be effective in removing water from the gas being treated.

Certain embodiments of the present curing systems or curing ovens include a scrubber for scrubbing or removing volatile materials from the inert atmosphere. The scrubber may include one or more components to facilitate sufficient removal of volatile materials from the atmosphere. For example, in certain embodiments, an oven or curing system may comprise a scrubber that includes one or more organic filters, one or more oxygen scavengers, or combinations thereof. The oven or system may comprise a scrubber that includes one or more charcoal or activated carbon filters, and one or more copper based catalysts, or combinations thereof. The scrubber of the oven or system may include at least one charcoal filter, and at least one copper based catalyst.

In at least one embodiment, a curing system, as disclosed herein, comprises a curing oven, a cold trap in fluid communication with the curing oven to receive volatile by-product containing gas from the curing oven, and a scrubber in fluid communication with the cold trap to receive gas that has passed through the cold trap, and in fluid communication with the curing oven to direct gas that is substantially free of volatile by-products back to the curing oven. In certain embodiments, the present systems include two or more of the ovens, the cold traps, the scrubbers, or combinations thereof.

It can be understood that atmospheric gas in the curing zones of the oven can contain volatile materials and may be directed through the cold trap to condense vapors containing volatile materials. The gas that passes through the cold trap may then pass through the filter of the scrubber to produce a filtered gas that is free or substantially free of organic volatile materials. The filtered gas may be exposed to the copper catalyst to remove reactive components, such as oxygen. The scrubber component of the oven may also include one or more solvent sensors to monitor solvent levels and provide an indication if solvent is not completely removed. The system may include redundant components and sensors, as well. In certain embodiments of the present ovens, the scrubber may comprise a reusable organic filter in addition to or instead of an activated carbon filter. For example, the filter component of the scrubber may be include one or more molecular sieves, such as sieves formed from a copper catalyst based material and the like. Other molecular sieves may contain materials such as aluminosilicate minerals, clays, porous glasses, microporous charcoals, zeolites, active carbons, or other synthetic compounds through which small molecules can pass. The components of the scrubber or the entire scrubber can be obtained from distributors, such as MBraun USA (14 Marin Way, Stratham, N.H. 03885).

The scrubber component and the vapor condenser component of embodiments of the present ovens or contact lens curing systems may be an integral component of the oven, or it may be spaced apart from the oven. The scrubber and vapor condenser will be in gas communication with the interior of the oven, such as by way of one or more conduits capable of passing volatile-containing gas and volatile-free gas between the oven and the scrubber. Examples of conduit materials include steel piping, and piping of other metal materials and the like. As an example, a curing oven can be in gas communication with a vapor condenser via a conduit, and the scrubber can be in gas communication with the oven via a conduit between the vapor condenser and the scrubber.

In some embodiments of the ovens, there may be only two curing zones, only three curing zones, or more than three curing zones. In some embodiments, a six-zone oven may be provided by using the each of the two zones three times, or using each of the three zones two times. In a two-zone embodiment, the mold advancement system of the oven may be arranged to move the contact lens molds from the first zone to the second zone and then back to the first zone.

The oven may be operable to maintain at least one zone of the plurality of zones at two or more different temperatures, and to change that zone's temperature between those temperatures. That zone may be the first or second zone.

In embodiments with more than two zones, the mold advancement system of the oven may be arranged to move the contact lens molds from the first zone to the second zone and then to another zone or zones, such as a third zone in a three zone embodiment.

The oven may comprise an entrance chamber or a first antechamber prior to first zone. The mold advancement system may be arranged to move the molds from the entrance chamber into the first zone. The entrance chamber may be arranged to be flooded with a chemically inert gas to provide the inert atmosphere. It may be that the entrance chamber is arranged not to be heated substantially above room temperature. The oven may comprise an automated placement device arranged to put the molds into the entrance chamber. In certain embodiments, the automated placement device may be understood to be a robot or pick and place device common in manufacturing automation. The automated placement device can also be understood to be a machine that picks up a batch of lens molds from a first location and places the batch of lens molds at a different second location.

The oven may comprise an exit chamber or a second antechamber after a last one of the plurality of zones. The mold advancement system may be arranged to move the molds from the last zone into the exit chamber. The exit chamber may be arranged to be flooded with the inert gas. It may be that the exit chamber is arranged not to be heated substantially above room temperature. The oven may comprise an automated placement device arranged to remove the molds from the exit chamber. In certain embodiments, the automated placement device may be understood to be a robot or pick and place device common in manufacturing automation. The automated placement device can also be understood to be a machine that picks up a batch of lens molds from a first location and places the batch of lens molds at a different second location.

The entrance and exit chambers may be different chambers, so that the molds pass through the oven. Alternatively, the entrance and exit chambers may be the same chamber, so that the molds go into and leave the oven through the same chamber.

Using automated machines at the entrance and exit chambers may enable fully automated operation of the ovens. It also may enable flooding of a larger volume of the oven's environment with an inert gas than would be possible if humans operated the equipment.

The molds may be supported on transport units or carriers. Embodiments of the present transport units, including the illustrated embodiments, can be understood to be trays. A transport unit may refer to a single tray or a plurality of trays. The transport unit may also refer to a stack of a plurality of trays, each tray being in contact with an adjacent tray.

An important preferred though not essential feature of the present methods and systems addresses the desirability of keeping the temperatures of the zones constant and maintaining temperature differences between the zones, without using large guards that would hamper movement of a stack of trays or tray stack between the zones. High density stacking of the molds may especially be problematic, as it is desirable to have a uniform temperature distribution within the whole of the stack. That problem may be addressed by using baffling on the transport units. Alternatively, or additionally, it may be addressed by arranging the oven and/or the transport units so that airflow around and through the transport units helps to distribute heat evenly.

As an example, a transport unit can comprise a plurality (e.g., two or more) of trays coupled together to form a stack of trays or a transport unit. The trays can be coupled together to form a stack of trays using a variety of mechanisms. Each tray includes two opposing ends. The two opposing ends, or first and second opposing ends, of one tray include a block structure, such as a solid block, that cooperate with block structures provided on another tray to form two opposing tray stack sidewalls or transport unit sidewalls. Two adjacent trays can be coupled together using locating pins which can engage with recesses. In certain embodiments, the pins and recesses are located in the block structures. In other embodiments, the pins and recesses can be components of the trays and further help affect air flow between trays. The sidewalls of the tray stack form an insulated zone or a barrier between different temperature zones of the oven when different temperatures are used. Airflow can be directed between the trays between the sidewalls or block structures to provide a substantially uniform temperature throughout the transport unit. For example, the block structures can permit individual adjacent trays to be spaced apart and coupled together so that there is an airflow channel between two trays. The airflow can be monitored and controlled as desired. The airflow can be adjusted or controlled by a device that creates a current of air, such as a fan, blower, and the like.

Thus, it can be understood that at least one of the units may include a baffle portion arranged to form at least part of a zone wall, so that when the unit is in one of the zones, the zone wall acts to restrict heat flow into an adjacent zone. The units may include trays. Each of the transport units may include a baffle portion and the baffle portion of one of the transport units may be arranged to co-operate with a corresponding baffle portions on another of the transport units to form at least part of zone wall. Thus, when a stack of the trays is in one of the zones, the zone wall formed by the co-operating baffles acts to restrict heat flow into an adjacent zone. Each tray may be a substantially flat sheet and the baffle may be a substantially flat side wall (being a block or sheet) that is substantially perpendicular to the sheet. At least some of the transport units may be stacked vertically. Each of the individual trays, including the sidewall portions, is formed from non-reactive materials, such as metal materials and the like. In certain embodiments, the trays are stainless steel.

Another important preferred though not essential feature of the present methods and systems addresses the desirability of avoiding having a chemically sensitive or degradable mechanism within the heated zones for moving the molds or transport units containing the molds. It is desirable to avoid movement devices, such as conventional conveyor belts and the like, within the zones because the volatile by-products produced during the curing process can cause perishing and corrosion of such mechanisms. Thus, the present mold advancement systems are resistant to degradation caused by volatile by-products. In some embodiments, including the illustrated embodiments, the mold advancement system comprises a shaft extending through the oven and one or more tray stack engagement devices. The engagement devices can be moveable so that they can contact a portion of a tray stack and cause the tray stack to move parallel to the length of the shaft to which the engagement device is coupled. Other embodiments of the present mold advancement systems may use conveyor belts that are resistant to volatile by-product degradation resulting from the curing process.

In some embodiments, including the illustrated embodiments, the tray stacks are independent of each other and are not coupled together. For example, the transport units can move independently through the oven using mechanical components. As described herein, one method of moving the transport units through the oven is using a pawl unit or similar engagement device that can engage a single tray stack and cause the tray stack to move from one zone toward another zone, as described herein. However, in other embodiments, tray stacks may be coupled together. For example, a plurality of the transport units may include couplings to couple together at least two of said plurality of transport units to form a train of said units, so that the mold advancement system is operable to move all of the coupled units by moving any of the coupled units.

The present systems are effective in producing polymerized contact lens products, which can be further processed to produce hydrated contact lenses. The polymerizable lens precursor compositions provided in the molds provided on or in the transport units may be hydrogel contact lens forming materials, such as materials containing HEMA, NVP, PVP, MA, MMA, and the like. Or, the polymerizable lens precursor compositions provided in the molds provided on or in the transport units may be silicone hydrogel contact lens forming materials, such as lotrafilcon, balafilcon, galyfilcon, and senofilcon. Other silicone hydrogel lens forming materials may be provided in the molds. For example, a mold may comprise a lens forming material including a fluoro-containing dimethacryloyl silicone macromer, a hydrophilic vinyl-containing monomer, an acrylic monomer cross-linker, and an acrylate-functionalized ethylene oxide oligomer, and a polyalkylene oxide silicone extractable component.

In one aspect of a contact lens curing method, a method of forming contact lenses by curing contact lens precursor materials in molds is provided. The method comprises providing an inert atmosphere in an oven, and heating the molds in the oven to, and maintaining them at, each of a plurality of different temperatures, wherein the method further comprises maintaining the molds at a first of the temperatures in a first zone of the oven, moving the molds from the first zone to a second zone of the oven, and maintaining the molds in the second zone at a second of set temperatures.

The method may include the steps of changing the temperature of the first zone to a third temperature, different from the first and second temperatures, moving the molds back into the first zone, and maintaining the molds at the third temperature in the first zone.

The method may include the steps of changing the temperature of the second zone to a fourth temperature, different from the first, second and third temperatures, moving the molds back into the second zone, and maintaining the molds at the fourth temperature in the second zone.

The method may include the step of moving the molds into a third zone and maintaining molds in the third zone at a temperature that is different from the first and second temperatures.

The method may include the step of moving the molds into one or more further zones and maintaining the molds in the further zones at further temperatures, which may be different from any temperature at which the molds have previously been maintained.

The method may include the step of moving the molds back into any zone in which they have previously been and maintaining the molds in that zone at a temperature, which may be different from any temperature at which the molds have previously been maintained.

An important preferable but not essential feature addresses the desirability of keeping the inert atmosphere inert without using too much inert gas (e.g. nitrogen). The method may include the step of placing the molds in an entrance chamber prior to the molds moving into the first zone. The method may include the step of moving the molds into an exit chamber from a last zone of the oven. The method may include the step of drawing air out from the entrance and/or exit chamber and replacing the air with the inert gas. Using "antechambers" in that manner can enable rapid establishment of the inert atmosphere within the oven.

It is desirable for the inert atmosphere to be clean and consistent. The method may include the step of filtering or scrubbing the atmosphere in the curing oven to remove volatile materials. It may be that the inert atmosphere comprises fewer than 100 parts per million (ppm) oxygen during the heating. In certain embodiments, there are fewer than 80 ppm, or fewer than 60 ppm, or fewer than 40 ppm oxygen present in the inert atmosphere during the heating.

The heating may be performed in a "closed" system, with the inert atmosphere being cleaned and recycled back into the heated zones. The method may include steps of drawing gas from inside the oven (for example from one of the zones in the oven, from an entrance chamber and/or from an exit chamber), cleaning or scrubbing the gas so drawn to produce cleaned inert gas, and then reintroducing the cleaned inert gas back into the oven.

The method may include the step of continuous or substantially continuous venting or extraction of volatile fumes and/or vapors produced from the volatile components within the precursor composition.

The method may include the step of removing residual materials that may accumulate from the thermal curing procedures.

Gas containing volatiles produced by the curing process, for example gas that contains by-products of reaction mixtures containing N-vinyl-N-methylacetamide (VMA), or methyl methacrylate (MMA), as well as water may be passed through a vapor condenser or cold trap, an organic filter or organic trap to remove organic volatile materials, and to produce a filtered gas. The filtered gas may be exposed to an oxygen scavenger, such as a copper-based catalyst or the like to create chemically inert gas. Thus, methods can include directing a volatile by-product containing gas produced from a contact lens curing process through a gas purification or recycle system, as discussed herein.

The method may include operating the oven on a balanced basis; i.e. putting molds into, and removing molds from, the zones at the same rate. As described herein, this can be accomplished by the mold advancement system of the present ovens.

The temperatures in the heating zones may be monitored and controlled so that the temperature remains constant in each of the zones. For example, the temperature may vary by ±5-10%. For example, when the curing temperatures are from about 50 degrees C. to about 80 degrees C., the temperature variation may be about ±4 degrees C. The temperature used to cure the lens precursor composition can vary depending on the lens formulation being polymerized. For example, the temperature may vary from about 30 degrees C. to about 135 degrees C. In certain embodiments, the temperature in one or more of the heating zones may be from about 50 degrees C. to about 130 degrees C. In other embodiments, the temperature in one or more of the heating zones may be from about 80 degrees C. to about 135 degrees C. In certain embodiments, the temperature in one or more heating zones of the oven may be about 50 degrees, about 55 degrees, about 60 degrees, about 65 degrees, about 70 degrees, about 75 degrees, or about 80 degrees C. As a further example, the temperature of the first heating zone can be maintained at 55±4 degrees C. the temperature of the second zone can be maintained at 80±4 degrees C. and the temperature of the third zone can be maintained at 80±4 degrees C. The temperature may be monitored regularly to ensure that it remains within a certain range of temperatures suitable to achieve formation of acceptable contact lenses. In addition, testing runs may be performed with tray stacks that do not contain contact lens molds and instead contain one or more temperature sensors, including arrays of temperature sensors, to ensure that the temperature is evenly distributed throughout the tray stack.

In certain methods, the contact lens molds can be cooled. For example, the contact lens mold assemblies and the lens material contained therein may be cooled in a curing zone of the oven. The cooling of the contact lens mold assemblies and lens material may be caused by reducing the temperature in the oven or a curing zone of the oven. For example, after a polymerizable lens precursor material is exposed to heat to form a polymerized contact lens product, a coolant can be delivered into the oven or around the contact lens mold assemblies to more rapidly reduce the temperature of the polymerized lens product to a temperate at or slightly greater than room temperature (e.g., at or slightly greater than 15 degrees C. to about 25 degrees C.) compared to methods in which no coolant is delivered (i.e., passive cooling conditions). By actively cooling the lens molds and the polymerized lens products after polymerization thereof, it is possible to reduce exothermic reaction effects of the polymerized lens product. Thus, the present methods may include a step of cooling the mold assemblies and lens products so that when the mold assemblies are removed from the curing systems, the mold assemblies and lens products are substantially at about room temperature. The cooling can be accomplished by delivering a cooled gas into the oven or near the mold assemblies, or by directing a cooling liquid through a portion of the cooling oven so that the mold assemblies and lens products can be actively cooled.

In another aspect, the invention provides an automated system for producing contact lenses, including an oven as described herein.

In other aspects of the present invention, a contact lens curing system is provided comprising an oven including a source of inert gas operable to provide an inert atmosphere in the oven during a curing process to produce polymerized contact lenses from a contact lens precursor materials provided in contact lens mold assemblies. The oven may include a plurality of curing zones and a mold advancement system for moving the contact lens mold assemblies between the plurality of zones wherein the inert atmosphere is provided at a first pressure; and a chamber surrounding the oven providing a second atmosphere at a second pressure that is greater than the first pressure of the inert atmosphere.

In yet other aspects of the present invention, a contact lens curing system comprising an oven including a plurality of curing zones is provided. A mold advancement system for moving the contact lens mold assemblies between the plurality of zones and a controlled atmosphere within the curing zones that provides a substantially chemically inert environment in which contact lens precursor materials can be polymerized in contact lens mold assemblies located in the curing zones are also provided.

It will be appreciated that aspects of the present invention described in relation to the method of the present invention are equally applicable to the oven of the present invention and vice versa.

BRIEF DESCRIPTION OF THE DRAWINGS

Certain illustrative embodiments of the present systems and methods will now be described in detail, by way of example only, with reference to the accompanying schematic drawings, in which.

DETAILED DESCRIPTION

Figure 1A:
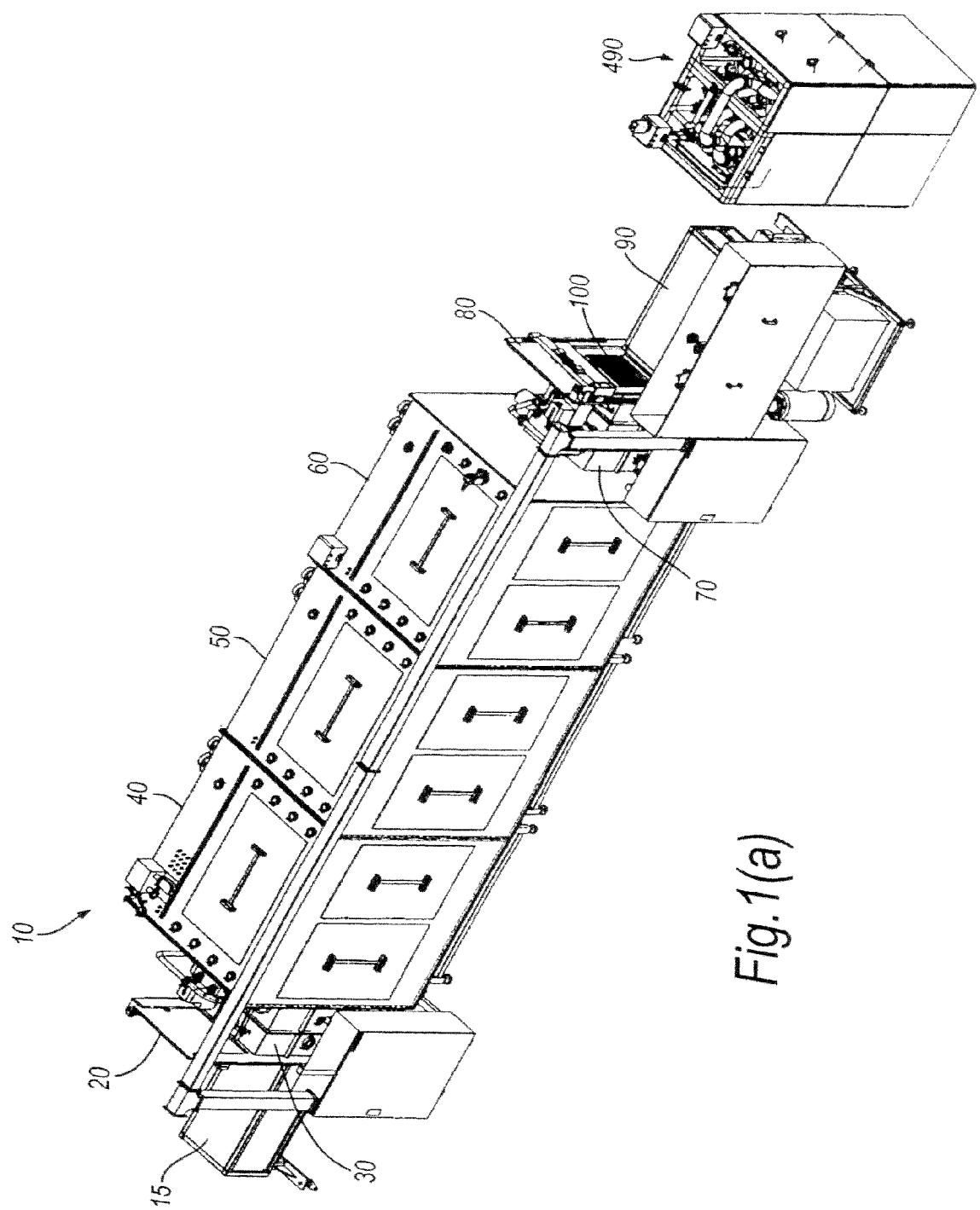
FIG. 1 is (a) a perspective view, (b) a top view, (c) a front view, (d) an end view and (e) a cross-sectional view (parallel to the front view) each view being of an example of a contact lens curing oven.
Figure 1B:
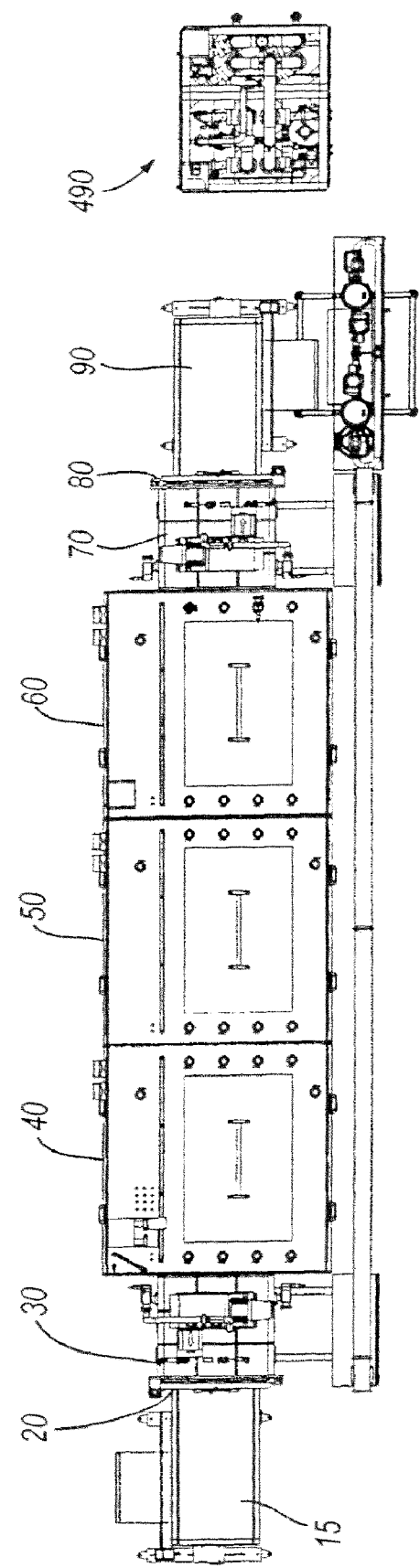
Figure 1C:
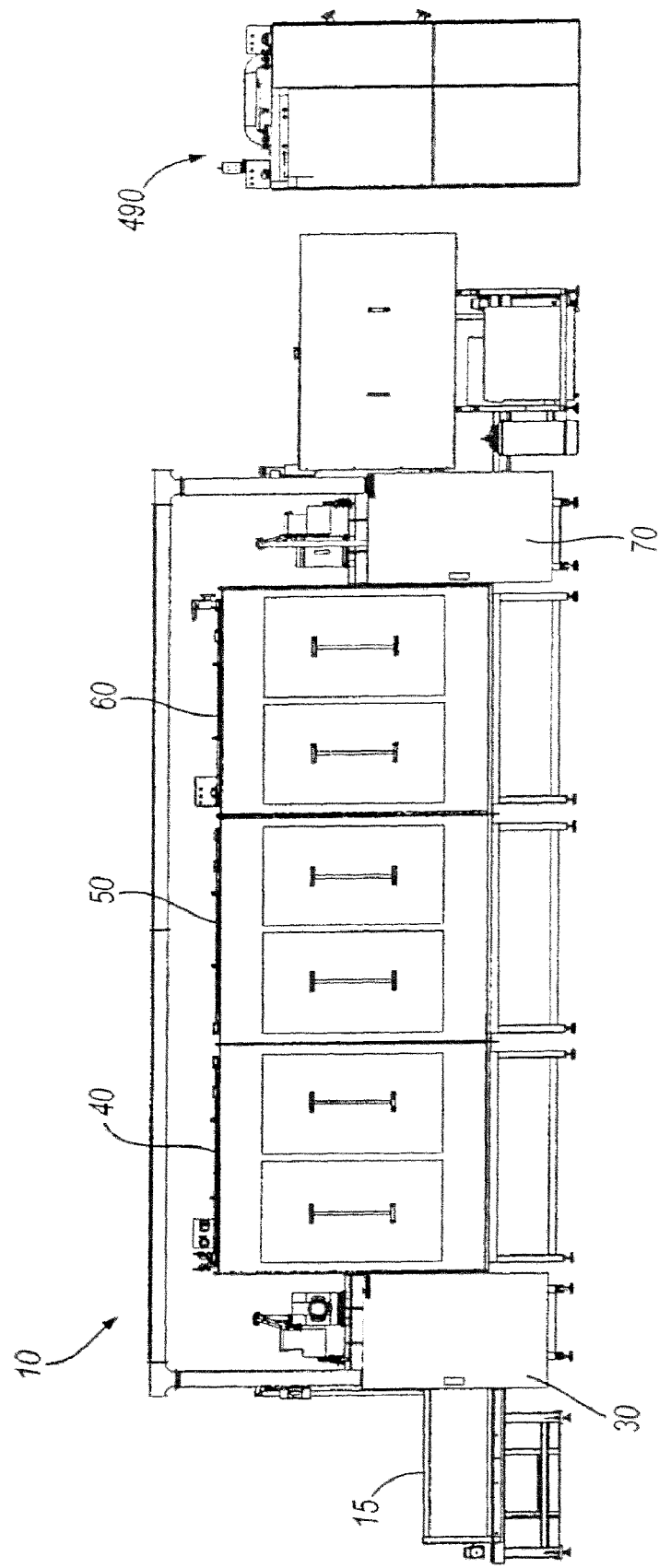
Figure 1D:
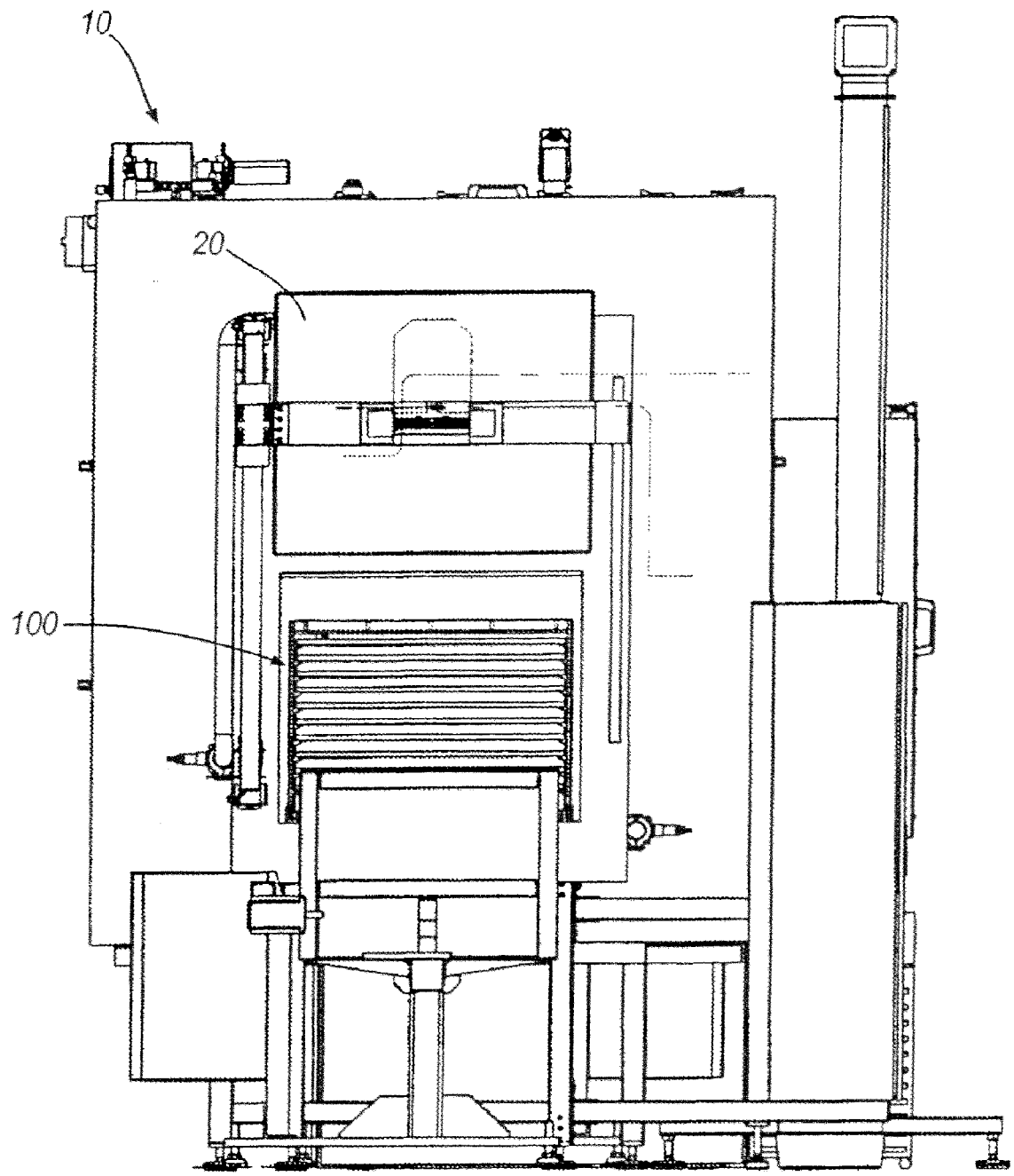

A contact lens curing oven 10 is used in the curing process of silicone hydrogel contact lenses (FIG. 1). It includes a loading station 15, a first access door 20, an entrance chamber 30, a first heating zone 40, a second heating zone 50, a third heating zone 60, an exit chamber 70, a second access door 80 and an unloading station 90. In this example, each zone is formed of two units that could be used as separate zones. For example the first heating zone 40 is formed from a first oven chamber 42 and a second oven chamber 47 (FIG. 1(e)). Each oven chamber 42, 47 holds one stack 100 of contact lens mold assemblies, and so each zone 40, 50, 60 holds two stacks at a time.

Adjacent to the entrance chamber 30 and exit chamber 70 are a first automated placement device (not shown) and a second automated placement device (not shown), respectively. The first automated placement device is arranged to load tray stacks 100 into the entrance chamber 30. The second automated placement device is arranged to unload tray stacks 100 from the exit chamber 70. The tray stacks 100 are moved from the exit chamber 70 by the second automated placement device to a reject station or to various bins or containers along a conveyor system (not shown). Cured lenses in mold assemblies are directed into different channels or paths, each channel leading to a different container, and each container being for different types of lens. The polymerized lenses are sorted according to type and then directed along those channels to the appropriate container.

Figure 1E:
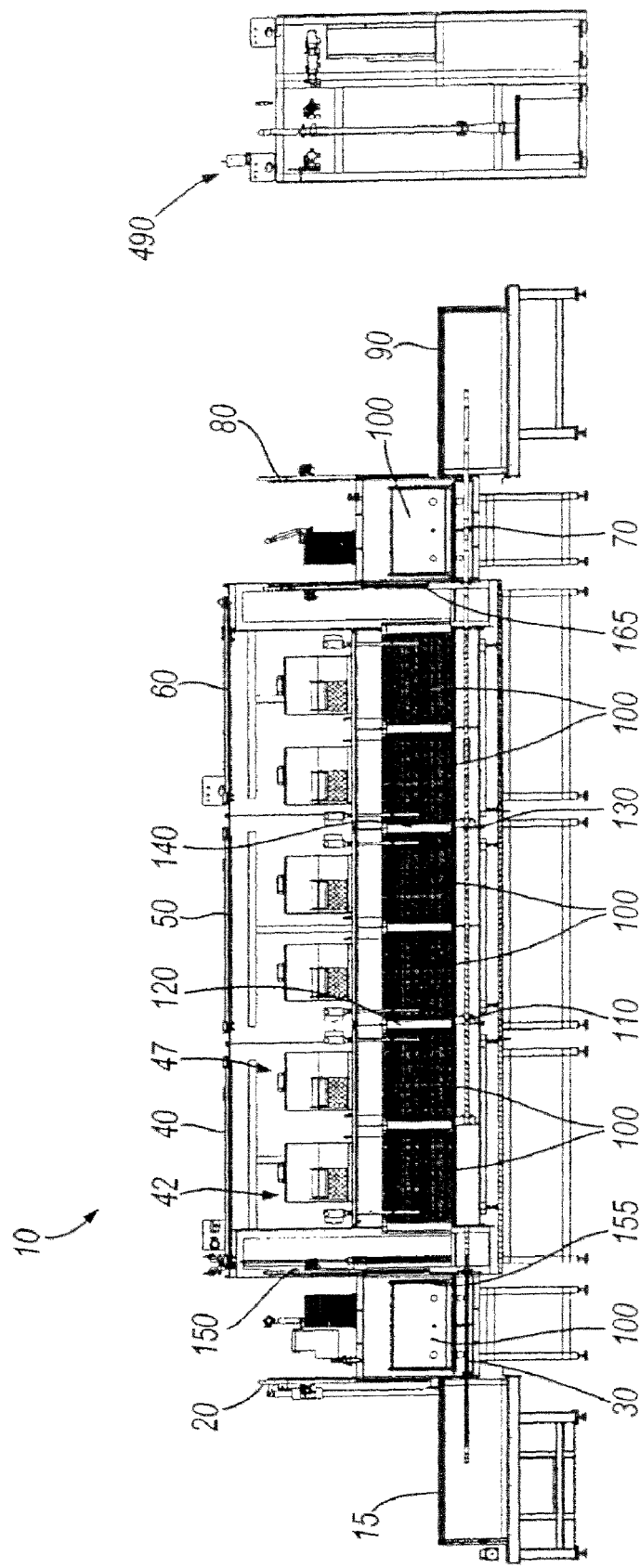

The first heating zone 40 and the second heating zone 50 are separated by a first wall 110 which includes an aperture 120 (FIG. 1(e)). The second heating zone 50 and the third heating zone 60 are separated by a second wall 130 which includes an aperture 140. In one embodiment, a plurality of heating elements (not shown) are positioned in each of the heating zones for providing the necessary heat to cure the lens precursor compositions in the time and cycles described herein. The heating elements may be mounted in the interior wall surfaces of the curing oven and in one embodiment are mounted in spaced part configuration from one another. The heating elements may be an induction heater type and are regulated by a controller (not shown), which also controls movement of the lens stacks carrying lens precursor compositions through the curing oven, as further discussed below.

Figure 2A:
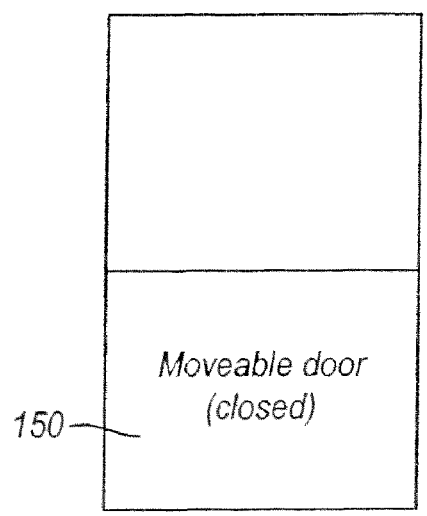
FIG. 2 is a schematic illustration of a moveable sidewall located between an antechamber and a heating zone, in which the sidewall is in (a) a closed position and (b) an open position, in which a portion of the sidewall has been moved upward to form an aperture through which a tray stack passes.
Figure 2B:
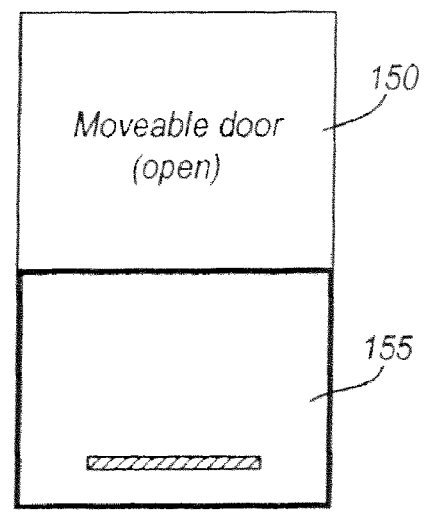

When the tray stack 100 has been placed in the entrance chamber 30, first access door 20 is closed, and a barrier 150 blocks the aperture 155 between the entrance chamber 30 and the first heating zone 40, acting to prevent the atmosphere surrounding oven 10 from entering the heating zones 40, 50, 60 (FIG. 2(a)). That atmosphere is extracted from the entrance chamber 30 and replaced with an inert nitrogen atmosphere. The barrier 150 is then removed (FIG. 2(b)) and the tray stack 100 enters the heating zones 40, 50, 60 without changing the inert atmosphere inside those zones 40, 50, 60.

Figure 3A:
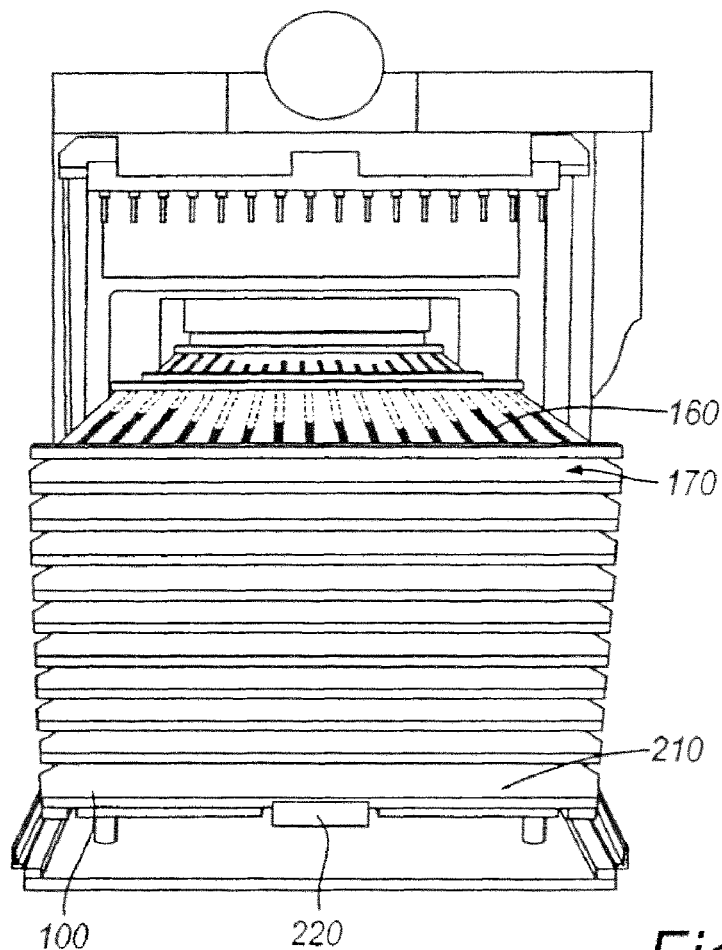
FIG. 3 provides two perspective views of a tray stack including contact lens molds, showing a tray stack outside the oven (FIG. 3A) and a tray stack inside the oven (FIG. 3B)
Figure 3B:
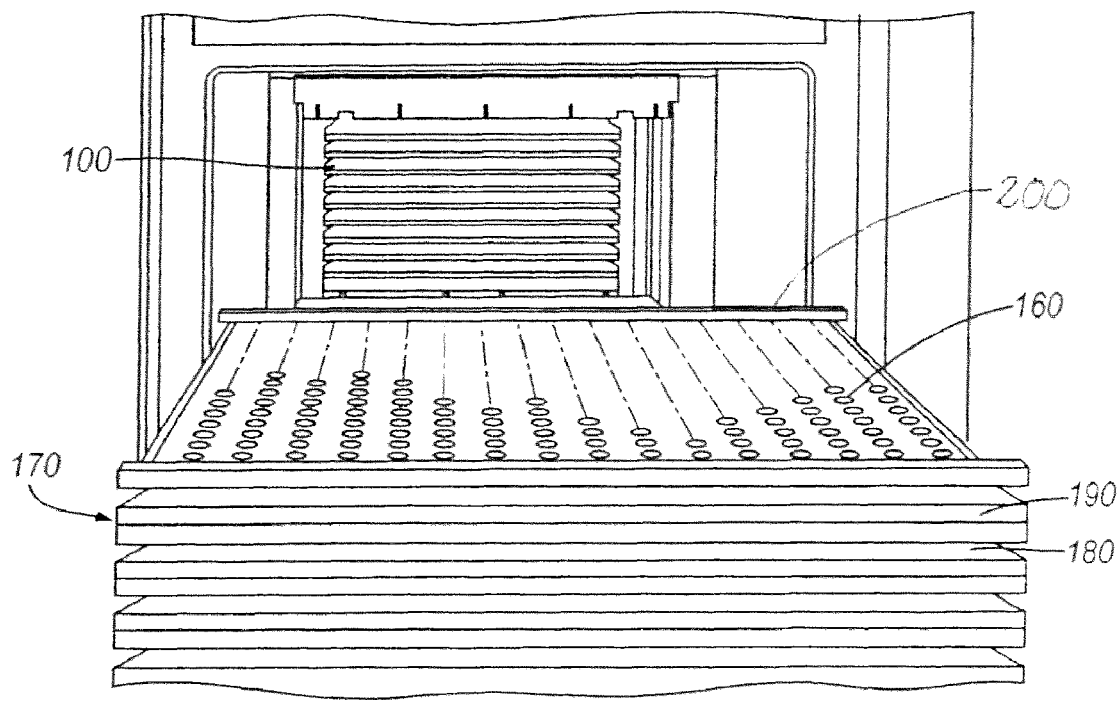

Contact lens mold assemblies 160 (FIGS. 3(a)-3(b)) including a lens precursor composition are arranged on trays 170 and the trays are stacked on top of each other such that they form the tray stack 100. In normal use a plurality of such tray stacks 100 is sent through the oven 10 in a continuous process.

In this example, there are ten trays 170, each tray 170 holding 256 contact lens mold assemblies 160 in a 16×16 arrangement. The trays 170 comprise a flat base 180 and a first baffle 190 arranged substantially perpendicular to the base 180 at a first end of the tray 170 and a second, substantially identical baffle (not shown) arranged substantially perpendicular to the base 180 at the opposite end of the tray 170. The first baffles 190 and the second baffles of the trays are arranged such that two or more trays 170 are stackable vertically on top of each other to form stack 100. It is important that the lenses are exposed to the same curing process whatever their position in the tray stack 100 and therefore the sides of the trays 170 not having baffles 190, 200, are open. The airflow is controlled throughout the heating zones 40, 50, 60 by fans (not shown) that blow air laterally across the zones 40, 50, 60, and therefore through the open sides of the trays 170 and across the mold assemblies 160. In this way a uniform temperature distribution is ensured throughout the tray stack 100.

The entrance chamber 30, heating zones 40, 50, 60, and exit chamber 70 are in successive communication with each other via apertures 155, 120, 140, 165 between them. The apertures 155, 120, 140, 165 are so located and sized that the tray stack 100 can precisely fit through them, with the baffles forming a wall-like barrier, almost completely blocking the aperture in which the baffles sit when the stack 100 is stationary.

Each of the heating zones, 40, 50, 60 operate independently and each oven chamber 42, 47 includes dedicated heating elements, an air re-circulation fan, temperature measuring devices and airflow measuring devices. However, the heating zones 40, 50 and 60 are in gas communication with each other, as the movement of tray stacks 100 through oven 100 means that there is no constant air seal between the zones 40, 50, 60, and a single inert environment exists throughout the oven 100. The first heating zone 40 is partially separated from the second heating zone 50 by a wall 110. The second heating zone 50 is partially separated from the third heating zone 60 by a wall 130.

Walls 110, 130 do not completely block the heating zones 40, 50, 60 from each other. Instead, an aperture 120, 140 in each of the walls, 110, 130 is located and sized such that the tray stack 100 can precisely fit through the apertures 120, 140. When the tray stack 100 is in the second oven chamber 47 of the first heating zone 40, its leading face is located in line with the aperture 120 in the wall 110, and the baffles 200 included on the trays 170 that make up the tray stack 100 act as a further barrier between the first heating zone 40 and second heating zone 50. Once the tray stack 100 passes through the aperture 120 in wall 110, into the first oven chamber of the second heating zone 50, the trailing edge including the baffles 190 that make up the tray stack 100 act as a further barrier between the first heating zone 40 and second heating zone 50. In this way, as the tray stack 100 passes from one side of an aperture 120, 140 to the other, it provides a barrier, separating one heating zone 40, 50, 60 from another, enabling the temperature difference of the zones 40, 50, 60 to be kept substantially constant. The use of these apertures 120, 140 and the blocking of heat transfer by the tray stack 100 moving through the oven 10 means the track stack 100 can move through the three heating zones 40, 50, 60 without any doors or barriers being opened.

The bottom-most tray 210 in each stack 100 includes two "handle" like devices 220, on opposite sides. These "handles" 220 extend from the sides of the bottom-most tray 210.

Figure 5A:
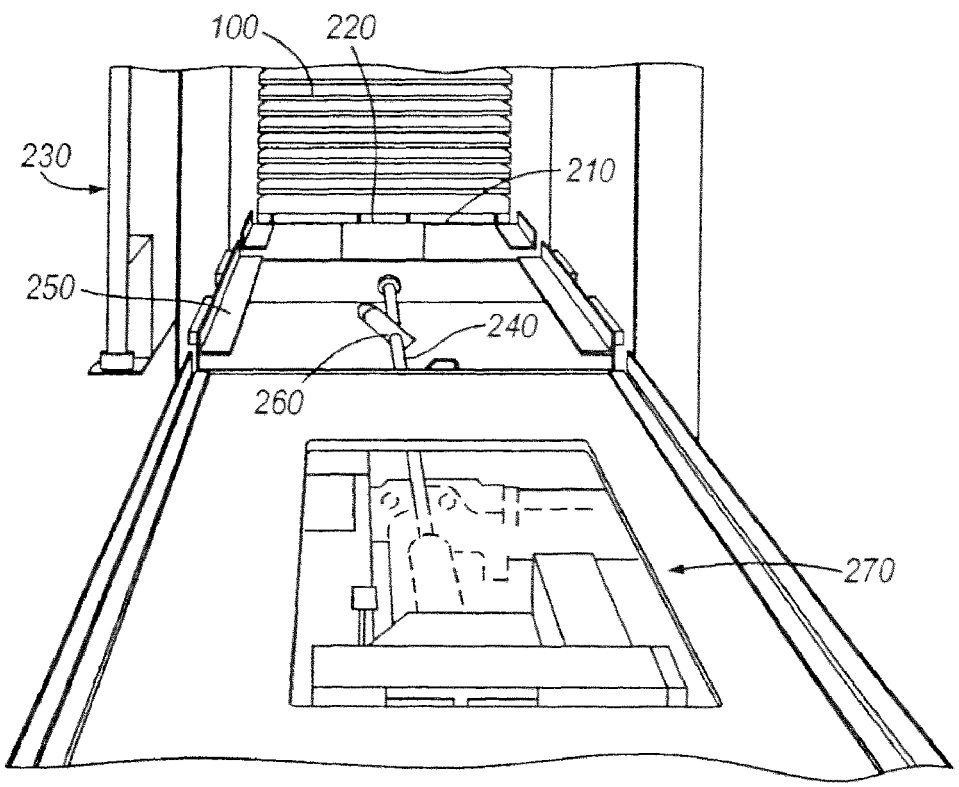
FIG. 5 provides three perspective views of a mold advancement system for moving tray stacks through the oven of FIG. 1, showing (a) the drive mechanism and shaft, (b) the shaft in more detail, including a pawl attached to the shaft, and (c) the shaft extending throughout the oven.
Figure 4:
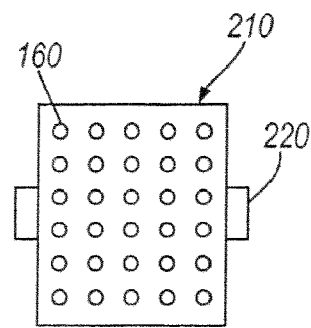
FIG. 4 is a schematic plan view of a bottom tray in the stack of FIG. 3.

When the tray stack 100 is loaded into the entrance chamber 30 it is engaged with a mold advancement system 230 (FIG. 5(a)) which transports the tray stack 100 from the entrance chamber 30, toward and through the first heating zone 40, second heating zone 50 and third heating zone 60 to the exit chamber 70. The stack 100 stops twice in each heating zone 30, 40, 50, once in each oven chamber 42, 47.

The mold advancement system 230 (FIG. 5(a)) comprises a push/pull control rod 240 that moves the tray stacks 100 through the oven 10 one step at a time. The tray stacks 100 are moved such that between movements of the tray stacks 100 there is always a boundary created by the baffle 190 on at least some of the tray stacks 100, the baffles 190 being located within the apertures in the walls 110 and 130.

Figure 5B:
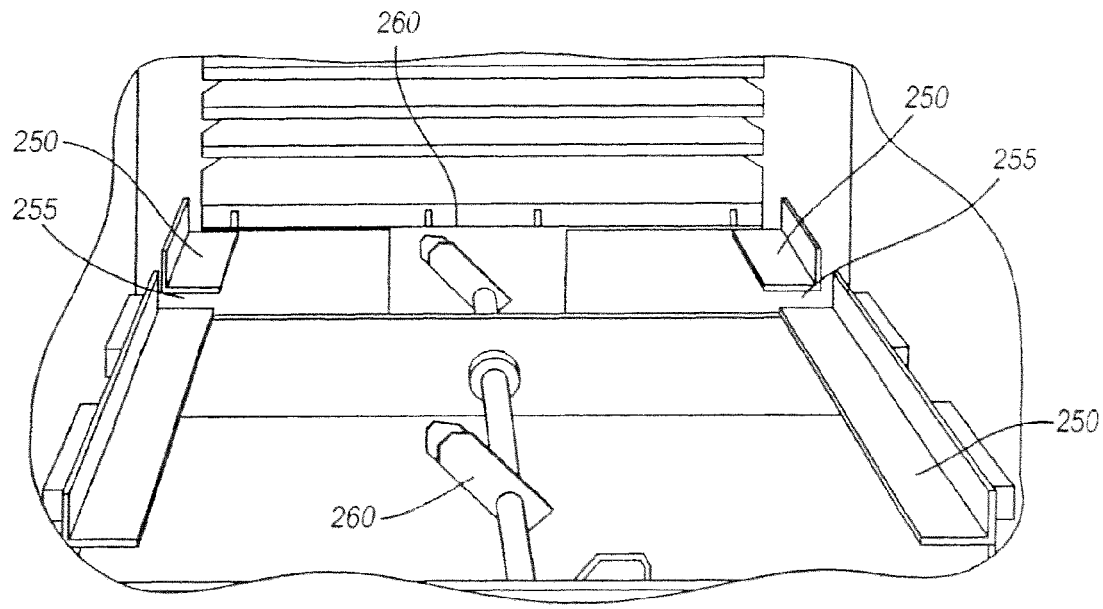
Figure 5C:
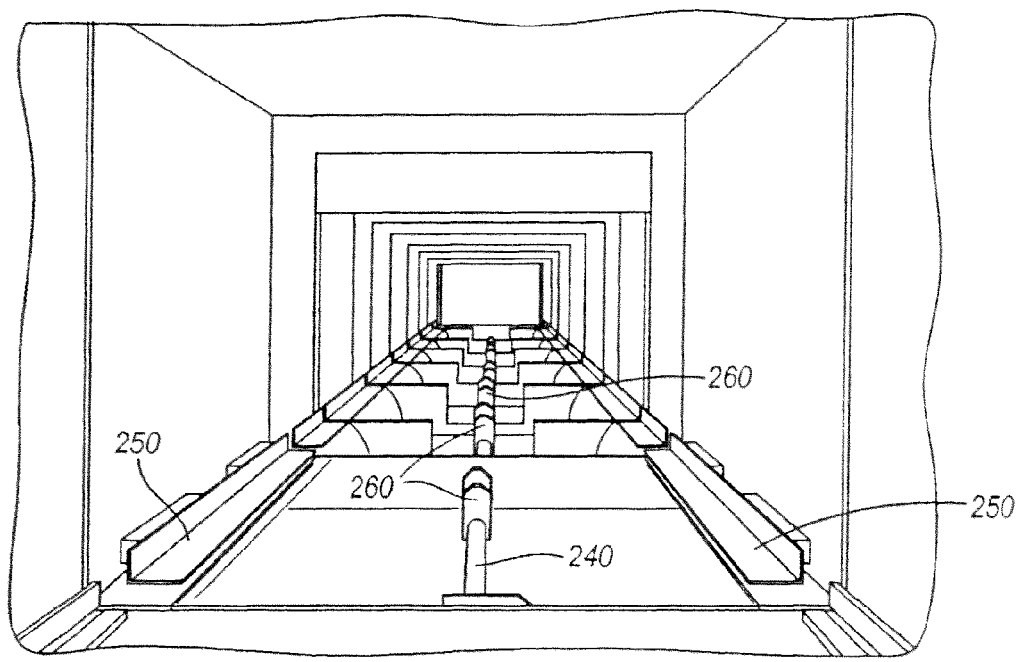

In more detail, the tray stacks 100 are supported and moved along two lateral side-rails 250 extending through the individual heating zones 40, 50, 60. In the illustrated embodiments, the side-rails 250 (FIG. 5(a)) terminate between two adjacent zones 40, 50; 50, 60 so that there is a gap 255 (FIG. 5(b)) between the side-rail ends of two adjacent heating zones 40, 50; 50, 60. A control rod or advancement shaft 240 is located between the two siderails 250 of one heating zone 40, 50, 60 and the advancement shaft 240 has a length that is parallel to the siderails 250. In the illustrated embodiments, the advancement shaft 240 extends through all of the heating zones 40, 50, 60 of the oven 10. (In other embodiments, each heating zone may include its own advancing shaft, and the individual advancing shafts may then be aligned so that the tray stacks can move properly through the heating zones.)

In each heating zone 40, 50, 60, a pawl unit 260 is provided on the advancing shaft 240. The pawl unit 260 is rotatably coupled to the advancing shaft 240 so that the pawl unit 260 can rotate about the central longitudinal axis of the advancing shaft 240. The pawl unit 260 can rotate to engage the tray stack 100 and can rotate to disengage from the tray stack 100. The pawl unit 260 can move along the length of the advancing shaft 240 from one end of the heating zone 40, 50, 60 to the opposite end of the heating zone 40, 50, 60. The pawl units 260 can also be understood to be traystack engagement members. In some embodiments, the pawl unit 260 rotates relative to the longitudinal axis of the advancing shaft 240 by rotating the advancing shaft. In other words, the pawl unit 260 is fixed to the advancing shaft 240. In other embodiments, the pawl unit 260 can be caused to rotate without rotating the advancing shaft 240.

Figure 6:
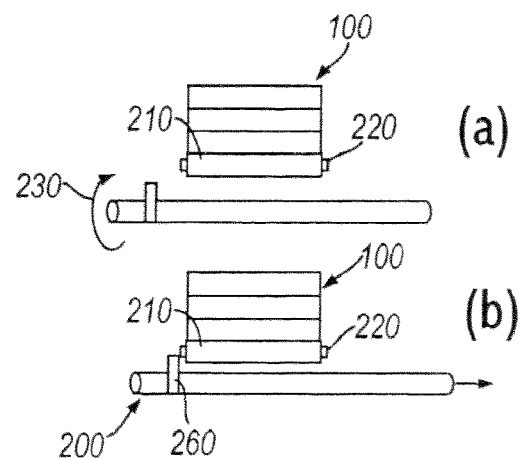
FIG. 6 is a schematic side view illustrating co-operation of the shaft and pawl of FIG. 5 with the tray of FIG. 4.

As an example, a pawl unit 260 is positioned near one end of the advancing shaft 240 in a heating zone 40. The pawl unit 260 is rotated to engage with handles 220 on the bottom-most tray 210 of tray stack 100. The pawl 260 is rotated adjacent to a handle 220 (FIG. 6(a)) and is moved against the handle 220 to engage the handle 220 (in this example pawl 260 and handle 220 are not coupled to each other, but just contact each other). As the shaft 240 moves, the pawl 260 presses against the side of the handle 220 and causes the entire tray stack 100 to move (FIG. 6(b)).

The pawl unit 260 is caused to move along the length of the advancing shaft 240 using a conventional servo drive 270. While engaged with the tray stack 100, the pawl unit 260 moves, by pushing and/or pulling, the handles 220, and hence tray stack 100, within the heating zone 40, 50, 60 and towards another adjacent heating zone 40, 50, 60. More specifically, the pawl unit 260 moves the tray stack 100 into a first position in the first heating zone 40. The tray stack 100 is exposed to heat for a predetermined amount of time. After the predetermined amount of time has elapsed, the pawl unit 260 moves the tray stack 100 to the next heating zone 50. The pawl unit 260 is then retracted and returns to the original position to engage with a second tray stack 100.

Figure 10A:
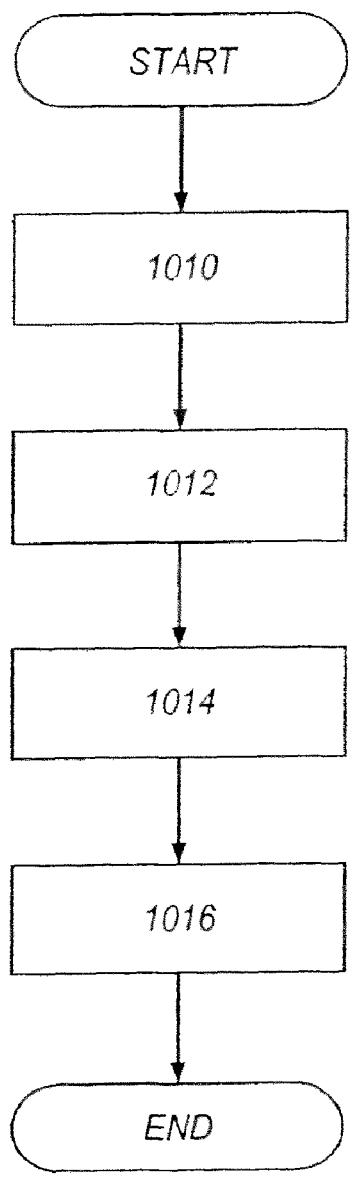
FIG. 10 is a flowchart setting out (a) the steps of an embodiment of the present contact lens curing methods, and including (b) sub-steps of a heating step
Figure 10B:
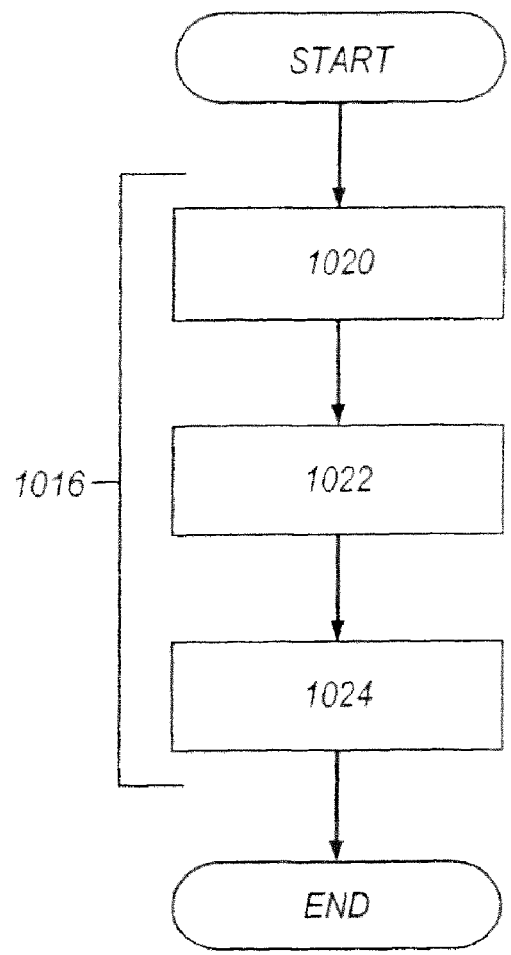

The following description follows the progress of a single tray stack 100 though the oven 10 (an example method of operating the oven 10 is summarized in FIG. 10(a): in practice, further steps are generally involved, as explained further below). In this example method of forming contact lenses, an oven is provided (step 1010), and is itself provided with an inert atmosphere (step 1012). Contact lens precursor materials are put into mold assemblies 160 (step 1014). The contact lens precursor materials are cured by heating the mold assemblies 160 in the oven 10 (step 1016). That heating step is shown in more detail in FIG. 10(b). The mold assemblies 160 are maintained at a first temperature in the first zone 40 of the oven 10 (step 1020). The mold assemblies 160 are moved from the first zone 40 to the second zone 50 of the oven 10 (step 1022). The mold assemblies 160 are maintained in the second zone 50 at a second temperature, different from the first temperature (step 1024).

A more complex method of operating the oven 10 will now be described in more detail. The tray stack 10 enters the production line through the access door (not shown) in a surrounding "second skin", discussed further below. A first automated placement device moves the tray stack 100 into the area before the entrance chamber 30. As mentioned above, another automated placement device loads the tray stack 100 into the entrance chamber 30. The entrance chamber 30 is then sealed from the external environment, and the barrier 150 is also brought down to separate the entrance chamber 30 from the first heating zone 40. The normal atmosphere is then evacuated from the entrance chamber 30 and replaced with an inert nitrogen atmosphere from a nitrogen gas source. In this embodiment, the inert nitrogen atmosphere comprises fewer than 100 parts per million (ppm) oxygen. (In alternative embodiments, the inert gas source may direct any other inert gas, such as a gas, including, without limitation, carbon dioxide, helium, argon, or other noble gases.)

In the present example, the first heating zone 40 is kept at a temperature of 55 degrees Celsius, the second heating zone 50 at 80 degrees Celsius, and the third heating zone 60 at 80 degrees Celsius. (In the example two-zone oven described below, the first heating zone is kept at a temperature of 50 degrees C., and the second heating zone is kept at a temperature of 80 degrees C.)

The tray stack 100 is driven by the advancing system 230 through the heating zones 40, 50, 60 at a substantially constant rate. Therefore, the time that a lens is cured at a particular temperature can be dependent on the length of the heating zone 40, 50, 60 through which it is moved. The time that the tray stack 100 remains in a heating zone 40, 50, 60 is predetermined based on the lens formulation and sample runs. Examples of suitable times in which a tray stack 100 remains in a single heating zone 40, 50, 60 can be from about 15 minutes to about 120 minutes, and or multiples of such times. The predetermined times that a tray stack 100 remains in a single heating zone 40, 50, 60 may be 30 minutes or a multiple thereof. For example, a tray stack 100 may remain in the first heating zone 40 for 30 minutes, the second heating zone 50 for 30 minutes, and the third heating zone 60 for 30 minutes. (In an example process using a two-zone embodiment, the tray stack may for example remain in the first heating zone for 30 minutes and the second heating zone for 60 minutes.)

In addition, there is a small amount of time between actual curing cycles when the tray stack 100 is transferred from one zone 40, 50 to another zone 50, 60. That can be understood to be a tray stack transfer time. The tray stack transfer time may be from about 1% to about 10% of the curing time. For example, the transfer time may be from about 1% to about 5%, or between 1% and 2%. As an additional example, for a heating zone curing time of 30 minutes, the transfer time between the first heating zone 40 and second heating zone 50 can be about 30 seconds. However, the transfer time may vary in other embodiments from about 15 seconds to about 2 minutes.

The tray stack 100 is moved from the entrance chamber 30 into the first heating zone 40. It remains in the first heating zone 40 until it has undergone the first heating stage of the curing process. It is then passed through the aperture 120 in all 110 and moves into the second heating zone 50, until it has undergone the second stage of the curing process. The tray stack 100 is then moved through the second heating zone 50, through the aperture 140 in wall 130 and into the third heating zone 50, until it has undergone the third heating stage of the curing process. The tray stack 100 finally passes through the third heating zone 50, through a final aperture and into the exit chamber 70.

Once the tray stack 100 has reached the exit chamber 70, a barrier between the third heating zone 60 and the exit chamber 70 is lowered to protect the third heating zone 60 from the normal atmosphere. As described below with reference to the second embodiment, the inert atmosphere including the volatiles released during the curing process is then drawn from the exit chamber 70 so that it is not released into the normal atmosphere. The third automated placement device then removes the tray stack 100 from the exit chamber 70 and moves it to an unloading station (not shown). At the unloading station the cured lenses are separated by type and are moved along channels (not shown) to the relevant bag or container adjacent to the conveyor system.

The above-described production process is controlled by a control unit (not shown). Once the process has been initiated, it is entirely automatic. The control unit is also connected to a plurality of sensors that track the lenses being cured through the process. The tray stack 100 includes information identifying the start of lot, end of lot, parts present, reject parts and time and date stamp. The information stored on the tray stack 100 and the sensors may, for example be barcodes etched onto a tray 170 or an RFID tag coupled with the relevant sensors. The information gathered by these sensors is passed on to the unloading station, where it determines how a product is bagged or grouped according to type. The control unit also monitors the lens rejects. Lenses may be rejected due to time of passage, temperature and airflow conditions not being measured as optimum throughout the oven 10. This information is stored in a data table relating to each lot of lenses. Reject lenses are placed in a reject bin. The control unit also monitors the temperature of the heating zones 40, 50, 60, the amount of volatiles and oxygen present in the atmosphere in the oven 10, and the timings of the curing process. If, for any reason, these values fall outside a certain predetermined range, an alarm is activated indicating that there is a serious fault.

The above description has followed the process from the perspective of a single tray stack 100. However, in use, the oven 10 will accommodate a plurality of tray stacks being moved through the heating zones 40, 50 and 60. The plurality of tray stacks 100 are arranged on the mold advancement system 230 such that they keep the different heating zones 40, 50, 60 separate due to the barrier effect their baffles 190 provide as they pass through the apertures 120, 140 in the walls 110, 130, as described above.

The man skilled in the art will appreciate that the first example embodiment could be adapted depending on the curing process required by, for example, introducing further heating zones to the oven 100. There could be four, five, six or more heating zones in variations of this embodiment.

Figure 7A:
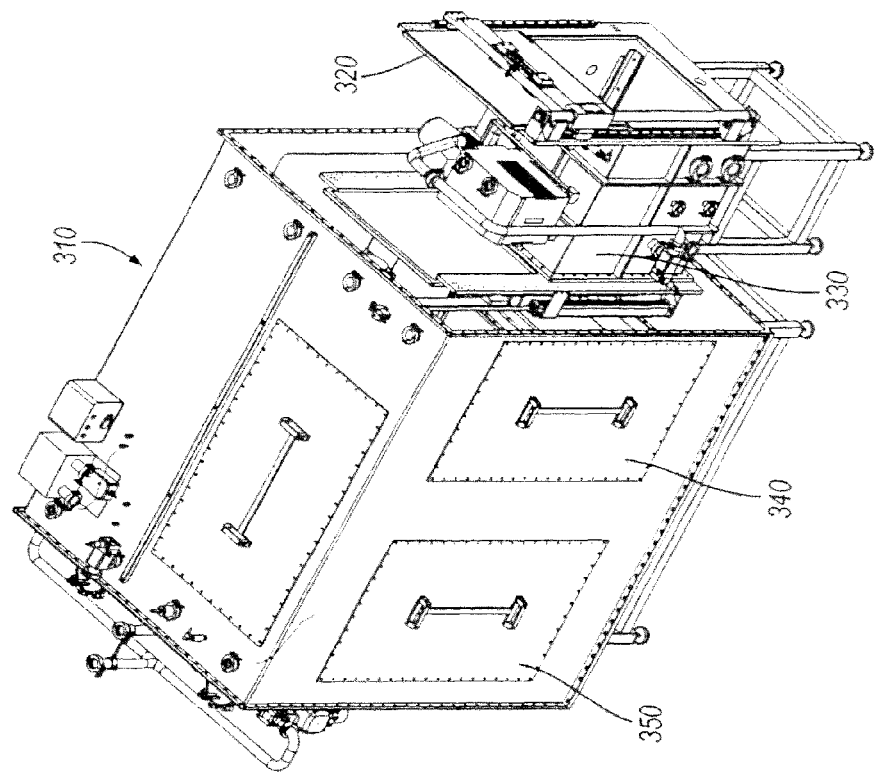
FIG. 7 is (a) a perspective view, (b) a top view, (c) a front view, (d) an end view and (e) a cross-sectional view (parallel to the front view) each view being of an example of another contact lens curing oven.
Figure 7A:
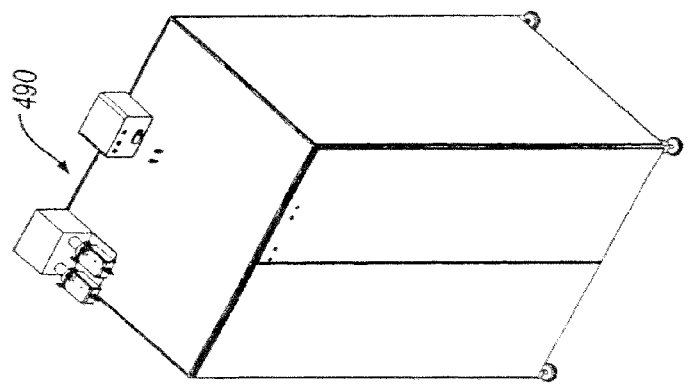
Figure 7B:
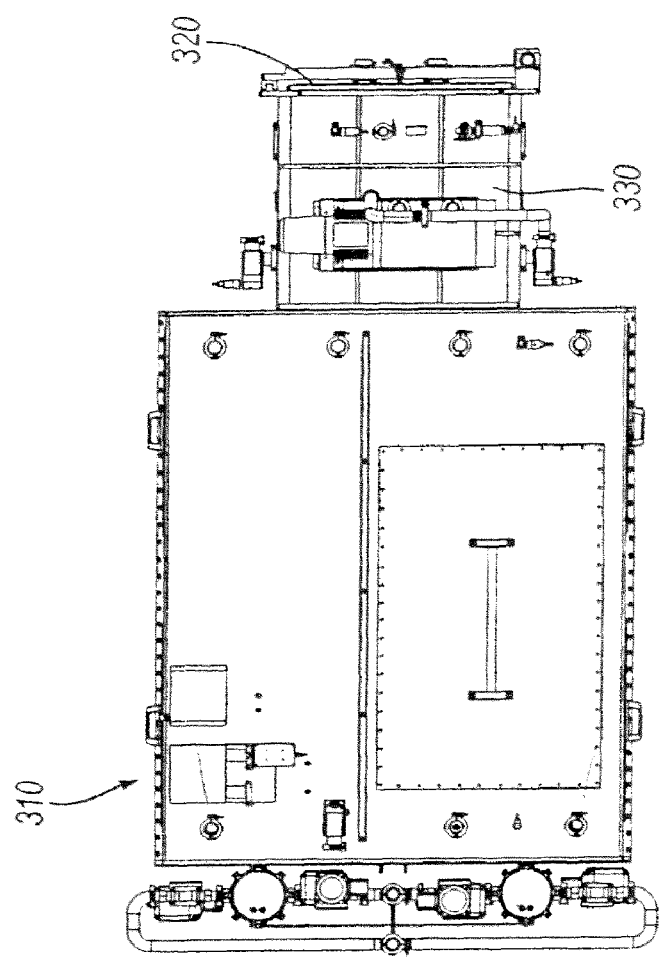
Figure 7B:
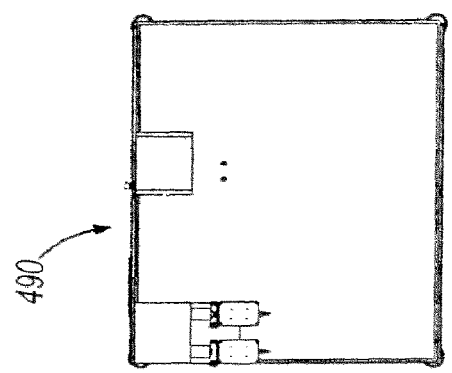
Figure 7C:
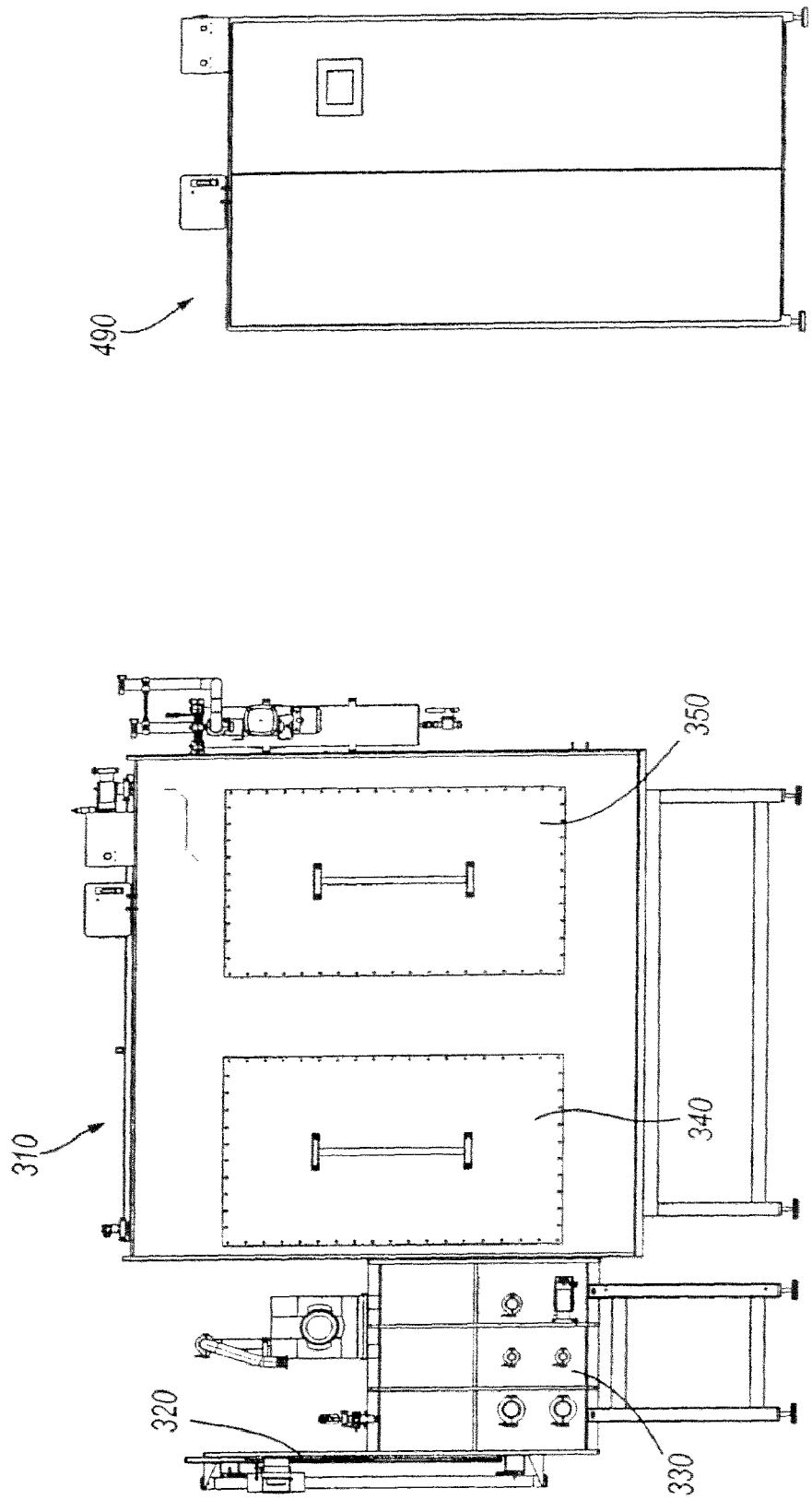
Figure 7D:
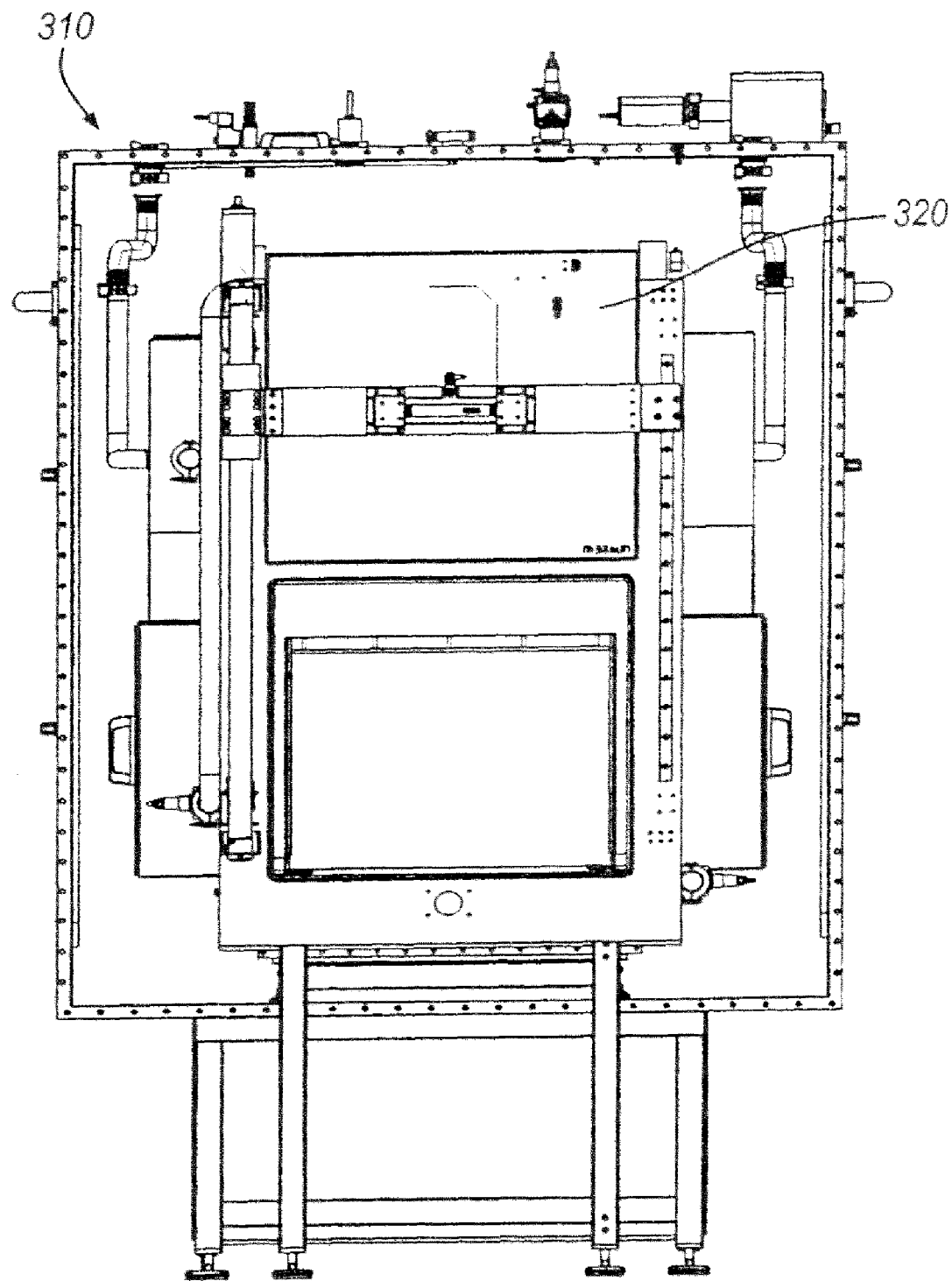

An oven 310 (FIG. 7(a)) is an example of a second embodiment of the invention. Oven 310 includes an access door 320, an entrance chamber 330, a first heating zone 340 and a second heating zone 350. (Note that here each heating zone is made from a single oven chamber (sized to hold one stack), in contrast to the first embodiment.)

Figure 7E:
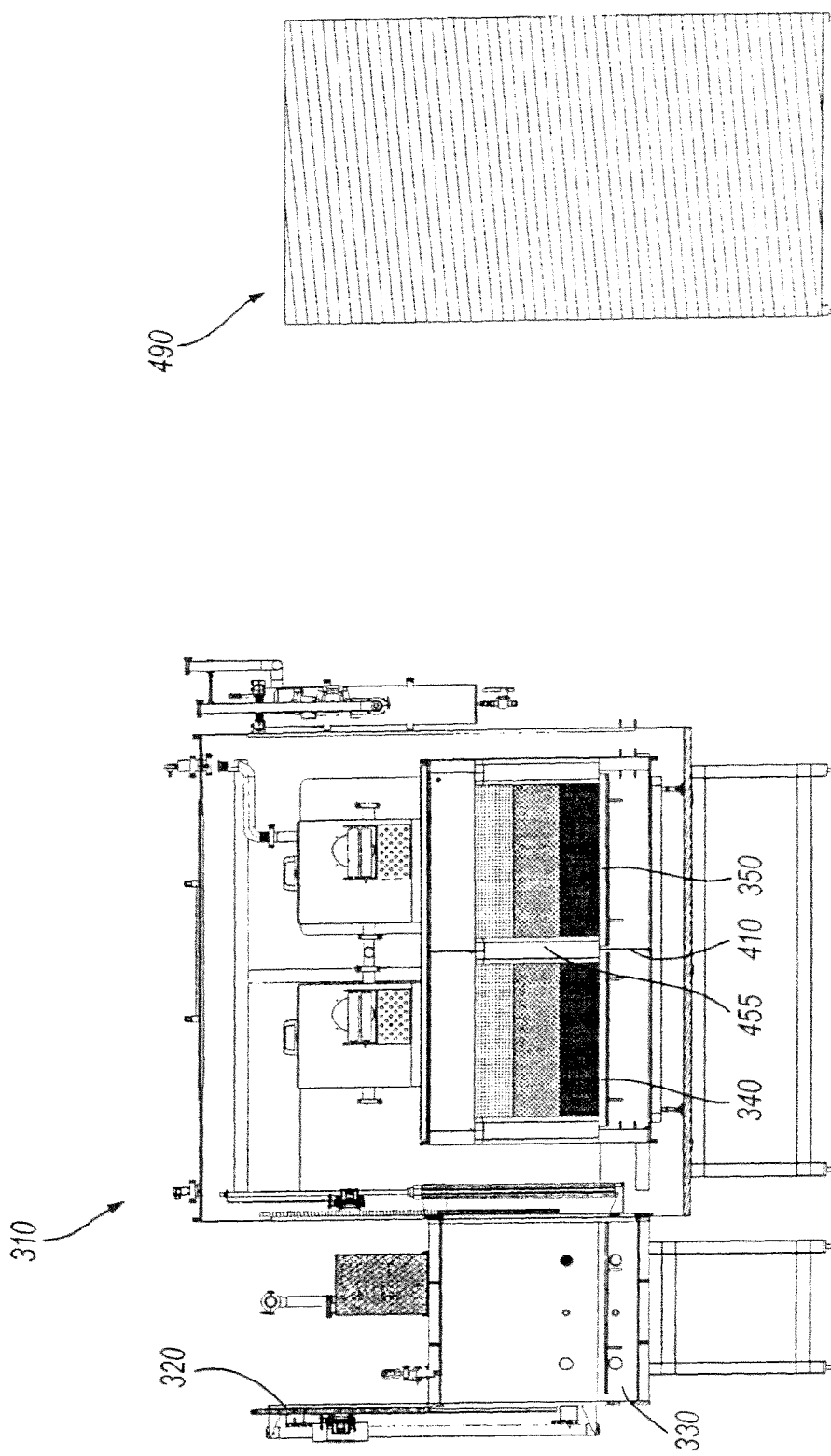

An automated placement device (not shown) loads a tray stack 100 into the entrance chamber 330. The first heating zone 340 and second heating zone 350 are partially separated by a wall 410 (FIG. 7(e)), the wall 410 including an aperture 455 so located and sized that the tray stack 100 may fit through the aperture 455, preferably in a precise manner with a sufficient clearance gap between the tray stack and the aperture.

As with the first embodiment, the entrance chamber 330 acts to create an inert nitrogen atmosphere around the tray stack 100 by evacuating the normal atmosphere and replacing it with a nitrogen atmosphere with less than 100 ppm of oxygen. The tray stack 100 is then moved into the first heating zone 340. In a manner similar to arrangement of the first embodiment, the tray stack 100 includes baffles which effectively block the aperture 455 in the wall 410, preventing any significant heat transfer between the first heating zone 340 and the second heating zone 350. The first heating zone 340 is at a temperature of 55 degrees Celsius and the tray stack 100 is held in this zone for 30 minutes before being moved to the second heating zone 350. The second heating zone 350 is at a temperature of 80 degrees Celsius and the tray stack 100 is held here for 30 minutes. When the tray stack 100 is held in the second heating zone 350 the temperature of the first heating zone 340 is changed to 80 degrees Celsius. Once the tray stack 100 has been in the second heating zone 350 for 30 minutes it is moved back into the first heating zone 340, now at a temperature of 80 degrees Celsius where it is held for a further 30 minutes. At the end of this curing process the tray stack 100 is moved back into the entrance chamber 330. There the inert nitrogen atmosphere, now including some impurities created in the curing process is extracted and replaced by the normal atmosphere. The inert nitrogen atmosphere that has been removed from the entrance chamber 330 passes through a filtration/scrubbing process to remove the impurities released during the curing process. The automated placement device then unloads the tray stack 100 from the entrance chamber 330 and moves it to an unloading station (not shown). The unloading station is similarly arranged to that as described for the first embodiment.

The curing process results in volatile materials being released into the inert atmosphere as the contact lens products are formed. A large build up of these volatile materials would degrade the curing process, causing impurities to form in the lenses and also making the insides of the heating zones 40, 50, 60; 340, 350 and the entrance chamber 30; 330 and exit chamber 70 dirty. It is also necessary to remove these volatiles before they enter the atmosphere due to the environmental and health and safety problems they may cause. It is most efficient to remove these volatiles by means of drawing the inert atmosphere containing the volatiles from the exit chamber 70 (or, in the case of the second embodiment, an enclosed space downstream of the second heating zone 350) and using a scrubbing and filtration process before re-circulating the clean nitrogen gas into the entrance chamber 30; 330. Thus the system includes a gas purification system or a gas recycler system. This is also advantageous as it reduces the cost of having to supply a large amount of inert and clean nitrogen gas. If the amount of volatiles created by the curing process is high, it is possible to use a recycling arrangement that takes the gas from all of the different zones 30, 40, 50; 330, 340 inside the oven 10; 310 and continuously scrubs and filters it.

Figure 8:
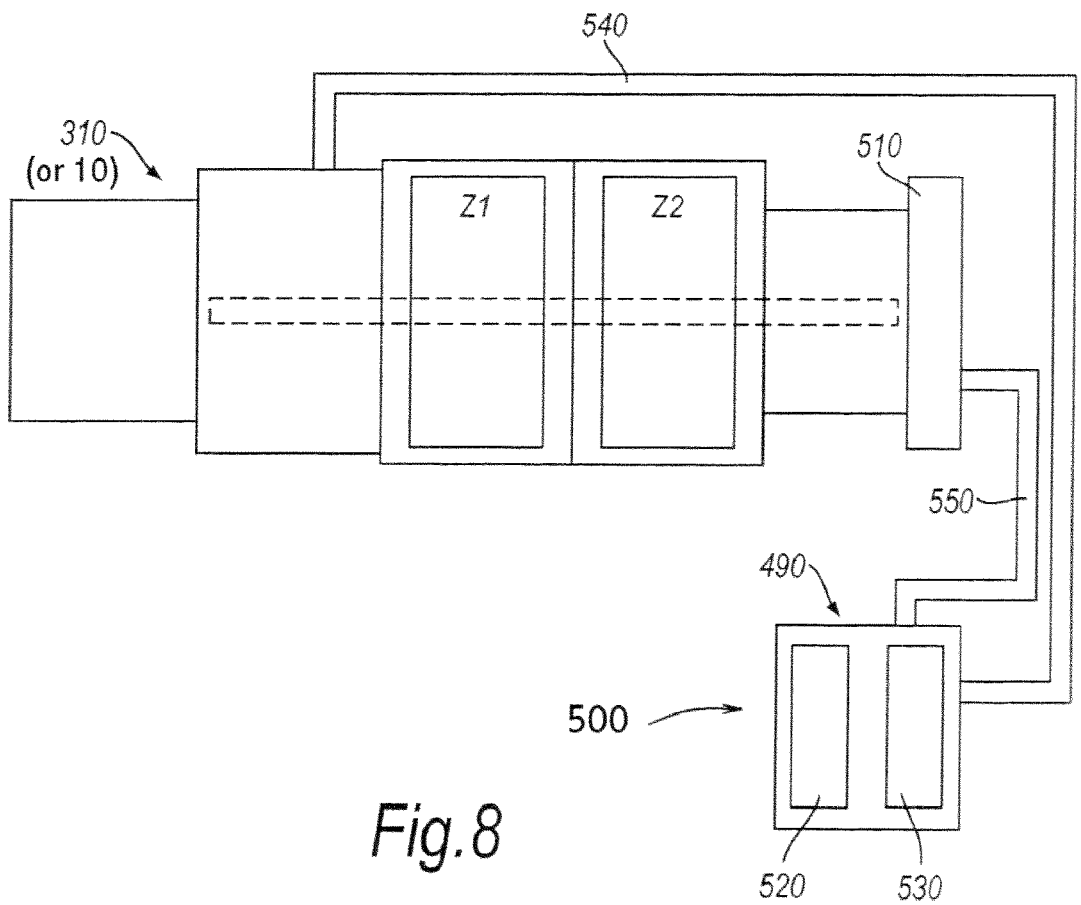
FIG. 8 is a schematic of the oven of FIG. 7, showing in more detail a processing system for processing an inert atmosphere in the oven.

In the example scrubbing and filtration process, used in both the first and second embodiments, is carried out in a unit 490 positioned some distance from the oven 10 or 310 and connected to it by piping 540, 550, which carries the gases. The process is illustrated for convenience with reference to the second embodiment (FIG. 8).

The "cold trap" or vapor condenser 510 is separate from the scrubbing system 500. The gas purification system (FIG. 8) includes (i) the cold trap 510: and (ii) a scrubber system in unit 500. The scrubber system includes (i) activated carbon filters 520: and (ii) a copper catalyst 530. The activated carbon filters 520 and the copper catalyst devices 520 are contained in a scrubber system housing (unit 490). A conduit 550 connects the cold trap 510 to the scrubber system 490, and another conduit 540 connects the scrubber system 490 back to the curing oven 10; 310.

It is advantageous if the ovens 10, 310 are double skinned with a slight overpressure between the skins, so if the inner skin of the oven is broken none of the volatiles released by the curing process into the inert atmosphere of the oven are released into the outer environment, causing an environmental and health and safety risk.

Figure 9:
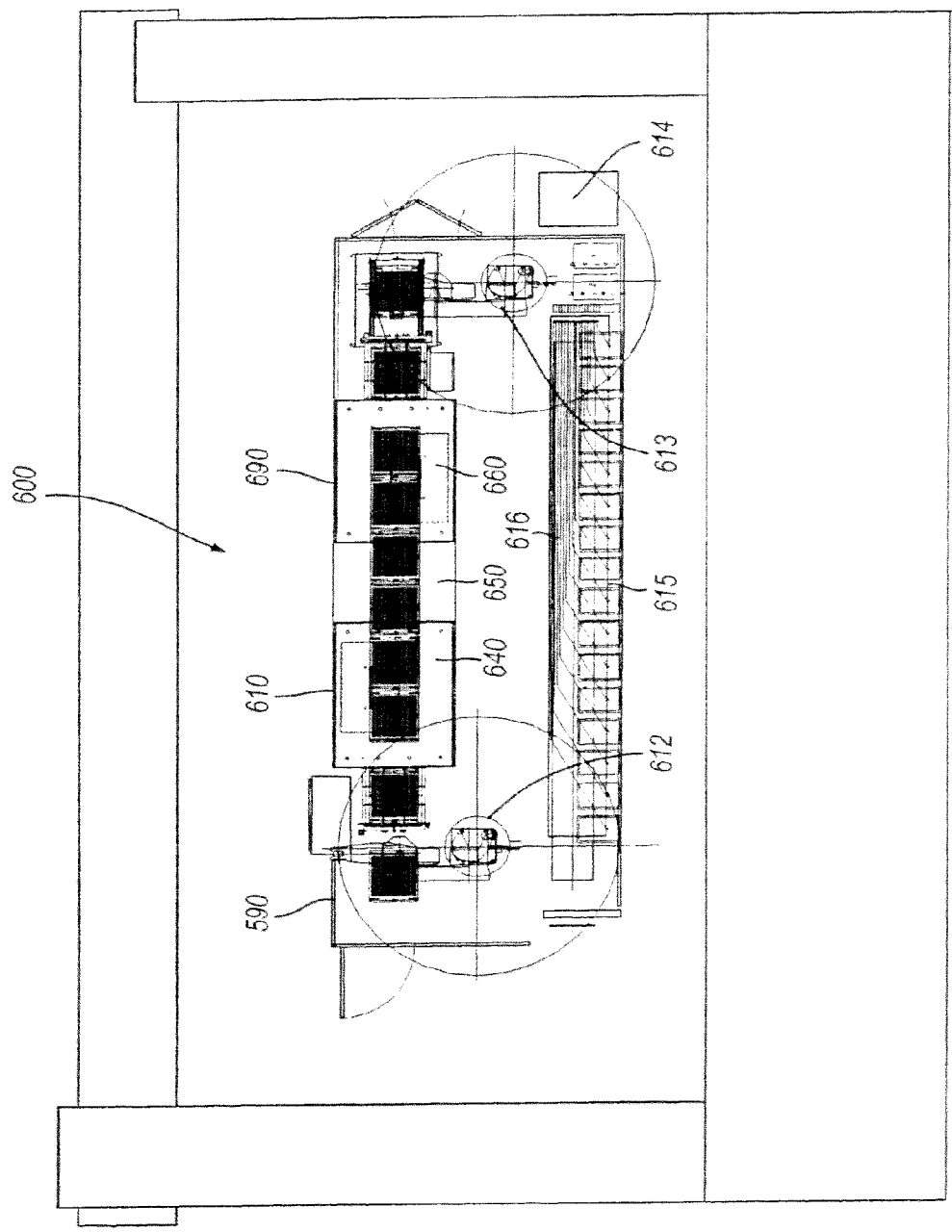
FIG. 9 is a top view of a contact lens curing oven enclosed within an airtight "skin"

Thus, in another example embodiment (FIG. 9), the oven system 600 comprises an outer safety enclosure 590 (or "second skin") surrounding the oven 610 and its associated automated placement devices 612, 613, reject station 614 and conveyor system 615 (which includes containers into which cured lenses are directed along channels 616). The space between the safety enclosure 590 and the oven outer walls 690 can be filled with a chemically inert gas, such as nitrogen. This added gas barrier helps to prevent contaminants from the outer air, such as oxygen and the like, from entering the heating zones 640, 650, 660, and in reducing inadvertent emission of volatile components from the heating zones into the outer atmosphere. In most situations, the space between the safety enclosure 590 and the oven 610 is filled with pure nitrogen and is not subjected to scrubbing.

Figure 11:
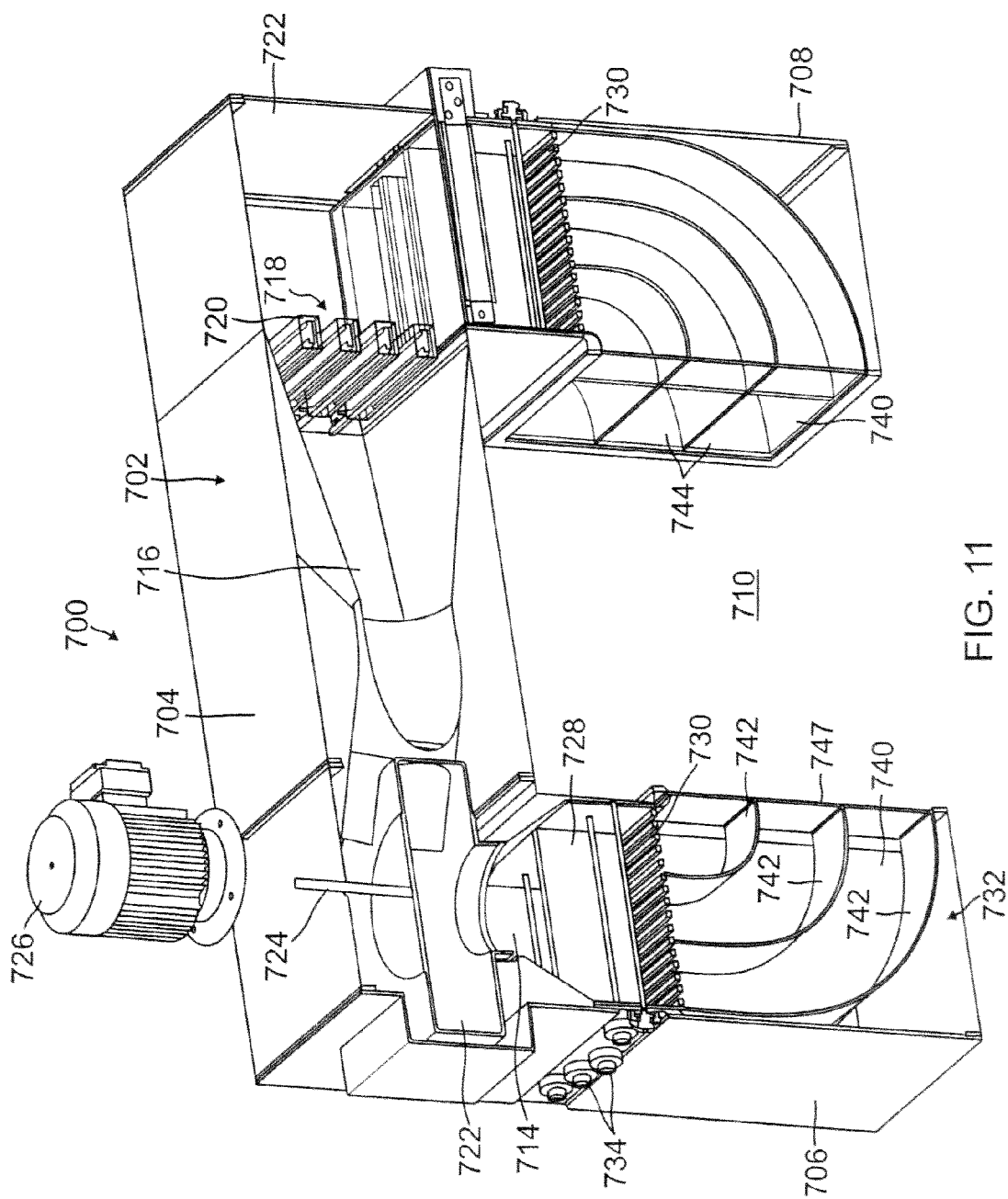
FIG. 11 is a cross-sectional perspective view of a forced draft heater system provided in accordance with aspects of the present invention; shown without a fan blade for clarity.

Referring now to FIG. 11, a cross-sectional perspective view of a forced draft heater system 700 provided in accordance with aspects of the present invention is shown. In an embodiment, the forced draft heater ("FDH") system 700 is configured to be mounted over a curing oven, such as 10, 310, or 600, to provide heat and draft air or gas for polymerization of the lens precursor materials in the stack of trays 100, as further discussed below. The FDH system 700 generally comprises a housing structure 702 comprising a header 704, a discharge duct 706, and a return duct 708, which collectively define a heating zone 710. When mounted over a curing oven, the heating zone 710 is sized to snuggly fit over a respective heating zone of the curing oven, as further discussed below. More preferred, the heating zone 710 fits over the curing oven in a size-on-size fit with the interface between the FDH system 700 and the curing oven fastened together, such as by screws, bolts, and/or rivets to fasten one mounting flange with another mounting flange or section. The header 704 incorporates a fan housing 712 for accommodating a fan or impeller (not shown) and a diffuser 714. The fan may be a centrifugal plug fan-type or other similar functioning fan. An inlet reducer 716 is located upstream of the fan housing 712 for directing circulated inlet gas through the fan (not shown) to circulate the interior atmosphere through the curing oven. A shaft (not shown) is connected to the fan (not shown) and a motor 726 is coupled to the shaft for rotating the fan. The motor is shown mounted over the fan housing, and more particularly mounted on an exterior surface of the header to facilitate access for assembly and maintenance. The motor may be sized and selected in accordance with established electrical engineering practice. In one embodiment, the motor is sized to power a fan rated at higher than 350 CFM, such as higher than 750 CFM, and such as higher than 1000 CFM. Also shown adjacent the motor 726 is a recirculation line 724. As previously discussed, the recirculation line 724 may be used for sending volatile latent atmosphere to a scrubber and filtration unit to purify the atmosphere, such as to purify the inert gas. Once purified or scrubbed, the gas may be returned to the curing oven, either via a return nozzle mounted directly to the curing oven, to the header 702, or the return duct 708. Optionally but less preferred, a return nozzle may be incorporated in the discharge duct 706.

A bank of heating elements 718 comprising a plurality of individual heating rods or elements 720 are mounted at the collection end 722 of the header 704. In a preferred system, the bank of heating elements 718 are connected to a controller (not shown) that controls the timing and operation of the individual heating elements 720. For example, the controller can control when the heating elements 720 come on and off and for how long during the on and/or off cycles. In one embodiment, the controller controls the heating elements based on feedback from one or more thermocouples (not shown) mounted in the return duct 708, the discharge duct 706, the header 704, the curing over 10, 310 or combinations thereof In a preferred embodiment, the heating elements 720 are configured to operate during transient periods, such as when a lens stack 100 is placed into the curing oven to be cured, which may cause a temporary drop in operating temperature. Thus, the bank of heaters 718 may be identified as after heaters or secondary heaters.

Pluralities of primary heating elements (not shown) are positioned in the convection zone 728 of the discharge duct 706, just below the diffuser 714. Three heating elements may be incorporated, each spaced apart from one another and aligned longitudinally to coincide with the lengthwise direction of the header 704. Alternatively, the heating elements are aligned so that they overlap a corresponding vertical heating zone, as further discussed below. The heating elements may have a total or combined rated capacity of greater than 6 kW, such as 8 kW, 10 kW or higher and can operate continuously or intermittently and preferably can operate to maintain temperatures in the various curing oven zones at desired set levels. Thus, for example, if the FDH system 700 is mounted over the first heating zone 40 (FIG. 1(a)) of the curing oven 10, the heating elements are configured to operate at temperatures that maintain the first heating zone 40 of the curing oven at a first set temperature. The heating elements may also be attenuated up or down depending on the curing cycles, such as running to maintain the first heating zone at 50 degrees Celsius for 30 minutes and then increased to maintain the first heating zone at 80 degrees Celsius for another 15 minutes. While additional heating elements may be incorporated in a curing oven for use with the FDH system, such as previously discussed with reference to the curing oven 10 of FIG. 1, in a preferred embodiment, no heating elements are incorporated in the curing oven when the FDH system is incorporated.

To adjust gas or air flow through the discharge duct 706, a plurality of pressure inducing devices, such as louvers or dampers 730, are mounted just downstream of the primary heating elements, in the convection zone 728 located just above the sectioned discharge duct zone 730. In an embodiment, nine individual louvers 730 are incorporated to permit nine independent flow adjustments through nine different zones of the discharge duct. In one embodiment, each individual louver consists of a gate connected to a rod or shaft that in turn is connected to a control knob 734, such as by way of a cam, gear set, linkage system or other known means in the art. In other embodiments, fewer than or greater than nine zones may be incorporated in the discharge duct 706 with a corresponding number of louvers and control knobs. In a preferred embodiment, the pressure inducing devices each resemble two rectangular grates in which one grate is configured to slide over the other grate to create an opening. The grate opening of each device is adjustable with the use of a screw knob mounted on the outside of first skin. Additionally, a perforated plate 747 (FIG. 11) comprising a plurality of openings, such as round, square, or oval openings, may be incorporated at the exit of the nine zones, at the interface between the discharge duct 706 and the curing oven. The perforated plate can be configured to restrict ducted gas flow thus allowing pressure to build up in the discharge duct, which can enhance gas distribution of the ducted gas across the stack of trays 100. The perforated openings are each sized from about 0.5 inch to about 2 inches with about 0.75 inch being more preferred. Alternatively, the perforated plate can be configured to have about 25% to about 60% open area compared to solid surfaces.

Figure 12:
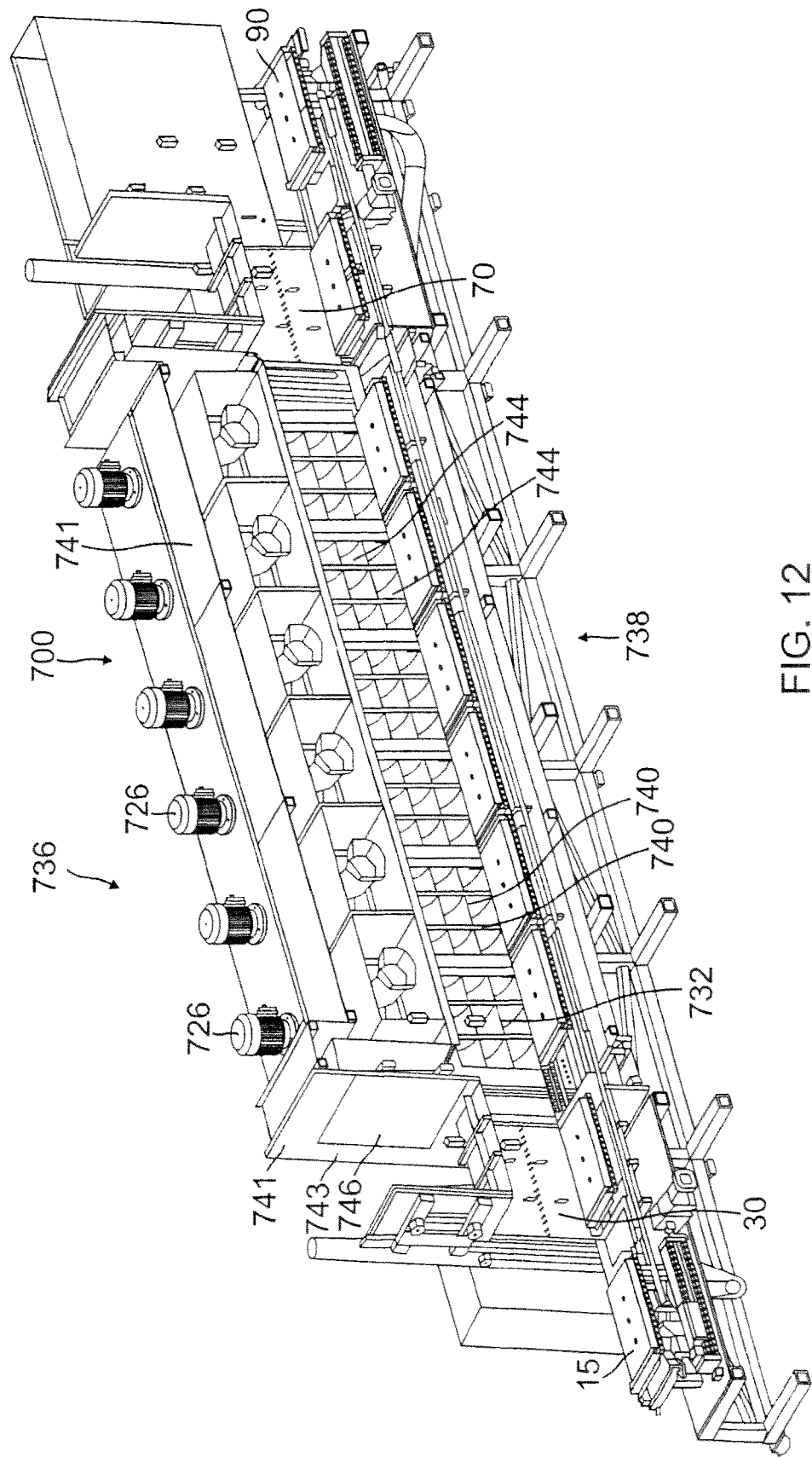
FIG. 12 is a cross-sectional perspective view of a bank of forced draft heater systems mounted over a curing oven.

FIG. 12 is a cross-sectional perspective view of a forced draft curing oven system 736 provided in accordance with aspects of the present invention, which comprises a curing oven 738 and a plurality of FDH systems 700. The curing oven 738 is similar to the oven 10 shown with reference to FIGS. 1-5 and in the particular embodiment incorporates six heating zones each with an FDH system 700 mounted thereon. As clearly shown, each FDH system 700 has a discharge duct 706 that is sectioned into different sectioned flow zones 732. With reference also to FIG. 11, two vertical panels 740 are incorporated to define three different vertical zones within a discharge duct 706. Additionally, three curvilinear panels 742 are incorporated to form three horizontal zones. In combination, nine individual flow zones 744 are incorporated in the discharge duct 706 of each FDH system. Obviously, gas flow can be adjusted differently by increasing or reducing the number of zones, which is contemplated in the present invention.

Thus, aspects of the present invention include a system for adjusting gas flow through a curing oven using a plurality of adjustable pressure inducing devices to induce gas flow through a plurality of zones in a discharge duct. The system allows for flow adjustments through the discharge duct so that as the gas exits the duct and passes through the curing oven to the return duct 708, different flow adjustments may be made to change flow and temperature characteristics of different interior sections of the curing oven. Advantageously, heated inert gas can be regulated across a lens stack 100 to permit a desired heat and flow distribution across the stack to achieve a desired curing effect. In one embodiment, thermocouples are mounted in the discharge duct 706, the curing oven, and/or the return duct 708 to provide temperature feedback in the various zones to facilitate flow adjustments. The present embodiment may also be automated by using controllable motors, such as servo motors, to rotate the pressure inducing devices 730 based on, at least in part, feedback received from the various thermocouples. A controller, as that term is understood by a person of ordinary in the art, may be used to regulate the pressure inducing devices based, at least in part, on signals received from the thermocouples.

Referring again to FIG. 11, in one embodiment, the return duct 708 is sectioned with a plurality of zones, similar to the discharge duct 706. In an alternative embodiment, the return duct has fewer zones than nine zones, such as one and up to eight zones, or greater than nine zones. Optionally, one or more pressure inducing devices 730 may be incorporated in the return duct with the same number of control knobs for adjusting the same. In the embodiment shown, nine pressure inducing devices 730 are incorporated to correspond with the nine flow zones. Additionally, a perforated plate (similar to 747) may be incorporated at the entrance of the return duct 708 to permit pressure build up inside the curing oven.

Figure 13:
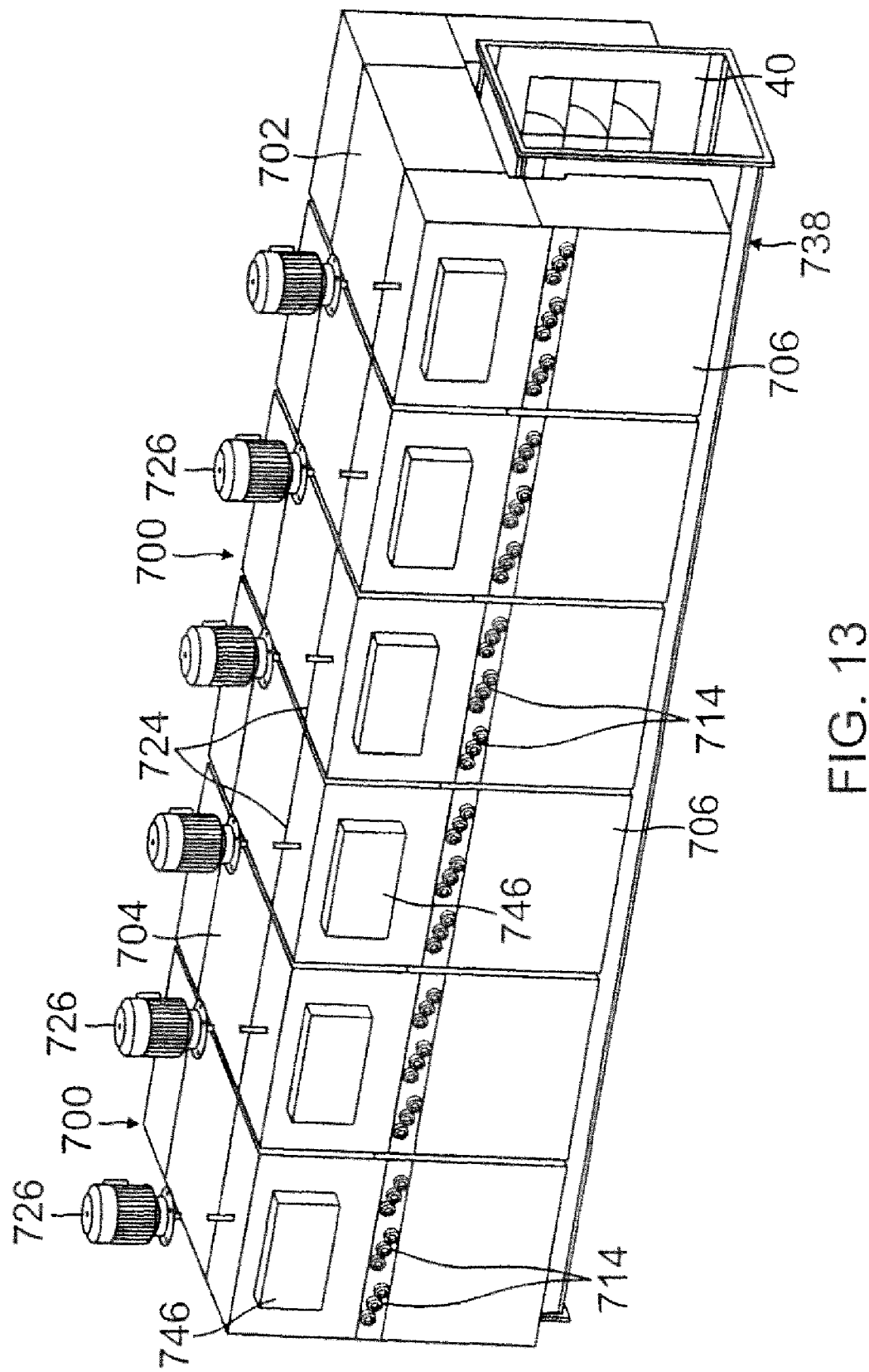
FIG. 13 is a perspective view of the system of FIG. 12.

FIG. 13 is a partial perspective view of the curing oven system 736 of FIG. 12. In an embodiment, a plurality of hatches or doors 746 are incorporated on the FDH systems 700. For example, a hatch may be incorporated on the header 704, on the discharge duct 706, and/or on the return duct 708 of each FDH system. The hatches allow for access to the interiors of the FDH systems for maintenance, inspection, upgrades, repairs, etc. In yet other embodiments, transparent inspection windows may be incorporated, such as heat resistant tempered glass. In other embodiments, inspection lights are incorporated to illuminate the oven interior for enhanced viewing.

Referring again to FIG. 12, in the embodiment shown, a second skin layer 741 is provided over the FDH systems 700 and the various zones of the curing oven 738, excluding the motors 726, which are mounted on the exterior top surface of the second skin layer. A dry gas seal, a bushing, a mechanical seal, or other sealing means may be used for sealing the surface between the second skin and the motor shaft of each shaft. The second skin layer 741 serves as a double wall containment for the forced draft curing oven system 736, which, as previously discussed, is configured to contain unwanted gas leak from the curing oven, which may contain undesirable volatiles (VOCs). The space between the second skin layer 741 and the inner wall layer of the FDH system and the curing oven may be pressurized with a gas blanket, such as nitrogen or other inert gas. Optionally, a VOC monitor or sensor may be located in the containment space to alert users of possible gas leak. In one particular embodiment, the second skin layer 741 has two axial ends that terminate at the first heating zone of the curing oven on one end and at the last heating zone of the curing oven on the other end. As shown in FIG. 12, one of the axial ends 743 of the second skin layer has an access door or hatch 746 for inspection, which may be one of many hatches incorporated in the system, as discussed with reference to FIG. 13.

Figure 14:
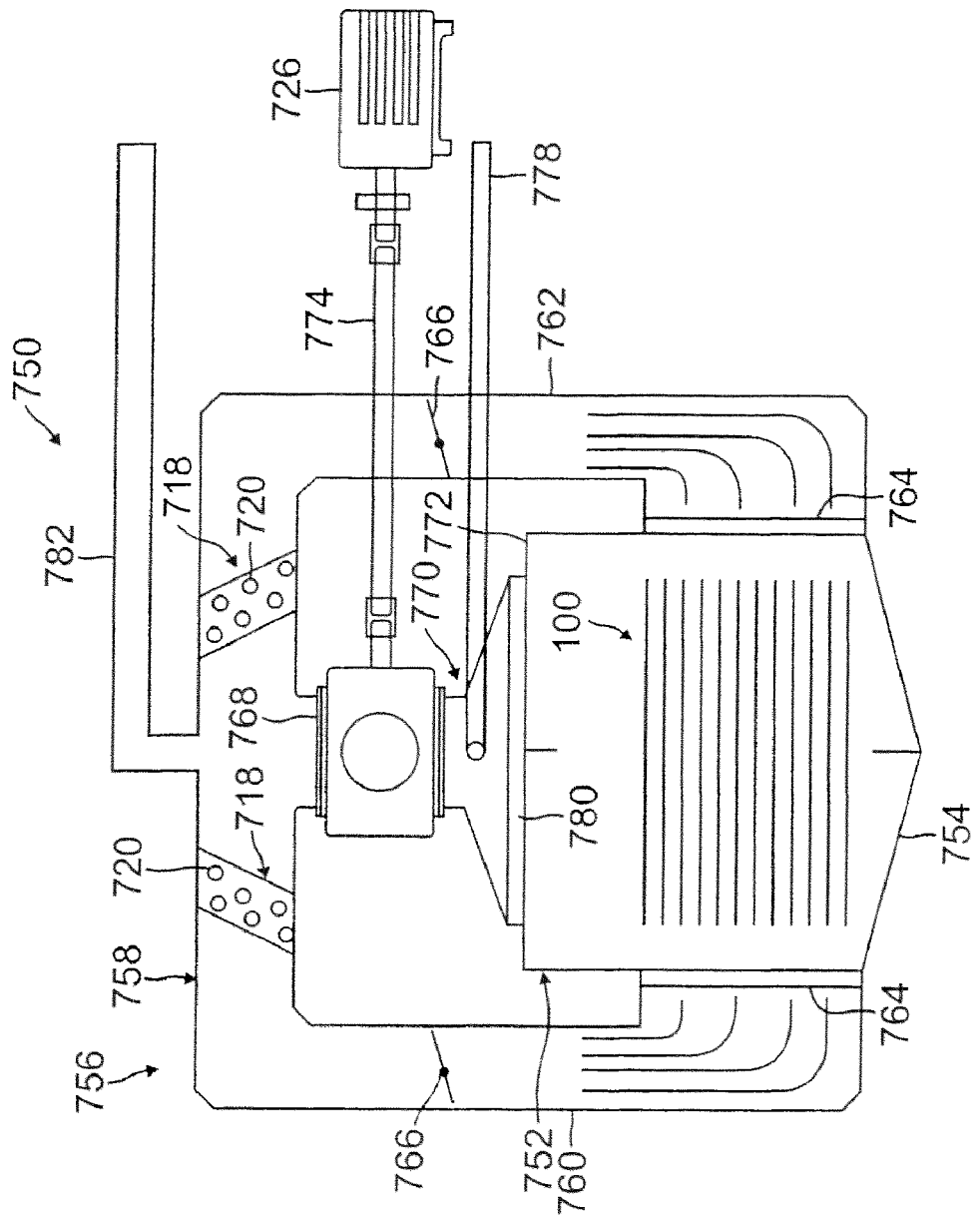
FIG. 14 is a schematic end view of an alternative forced draft heater system provided in accordance with aspects of the present invention.

FIG. 14 is a schematic cross-sectional end view of an alternative forced draft curing oven 750 provided in accordance with aspects of the present invention. In the embodiment shown, a tray stack of contact lens molds 100 is positioned inside a curing oven 752 for polymerizing lens precursor materials. Like the curing oven 10 of FIG. 1, the present curing oven 752 incorporates a drive system on which the stack of trays 100 are moved along the lengthwise direction of the curing oven. Additionally, a V-shaped oven floor 754 is incorporated to provide added clearance between the lowest tray in the tray stack and the oven floor. A V-shaped oven floor may be also incorporated in any of the previously described curing ovens. The added space allows for flow circulation through the lower section of the curing oven.

An FDH system 756 is provided for circulating flow and heat through the system. In the embodiment shown, the FDH system 756 includes a header 758 and two discharge ducts 760, 762, both of which being connected to side openings 764 of the curing oven 752. A control damper 766 is located in each of the two ducts 760, 762 for regulating back pressure, and hence flow characteristics, of the circulated gas through the curing oven 750. The control dampers may be connected to a controller for controlling the dampers. For example, the dampers may be activated to fully open, fully closed, or attenuated between the two positions to control gas flow through the two ducts. More preferably, the dampers are regulated based on temperature feedback to the controller.

Two banks of heaters 718 each comprising a plurality of individual heating elements 720 are incorporated in the header 758. As shown, the two banks of heaters 718 are located on either side of the exhaust duct 768, which provides downstream exhaust for the circulating fan or blower 770. The fan or blower 770 is mounted directly above the curing oven top wall 772 and is rotated by a coupling 774, which is rotated by a motor 726. In one embodiment, the return duct 762 is provided with a channel for accommodating the coupling 774 and the gas return line 778, as further discussed below.

The fan 770 may be an updraft fan or a plug fan, which takes suction at the inlet 780 and discharges flow out the exhaust 768, which is then deflected by the structure of the header and then flow across the two banks of heaters 718 and then eventually into the two discharge ducts 760, 762. As the gas flow across the heaters 720, it is heated so that heat is provided across the stack of trays 100 to cure the lens precursor materials loaded therein. Heat may be regulated as discussed above with reference other ovens discussed herein.

A vent line 782 for withdrawing volatile gas away from the system 750 is incorporated. As previously discussed, the removed gas may be scrubbed and/or filtered to remove unwanted volatiles emitted during the curing process. The scrubbed and/or filtered gas can be returned to the system via the return line 778. Alternatively or in addition thereto, fresh or new inert gas may be blended or added to the system via the return line 778. Advantageously, when a stream of gas is recycled instead of evacuating and replacing with new inert gas, the heat value of the gas is conserved so that less BTU is wasted to heat replenished gas. Thus, aspects of the present invention include a method for recycling heated inert gas for polymerizing lens precursor materials.

Whilst the present invention has been described and illustrated with reference to particular embodiments, it will be appreciated by those of ordinary skill in the art that the invention lends itself to many different variations not specifically illustrated herein. Certain variations are described above and further variations are described by way of example below.

One embodiment of the present systems as described in relation to FIG. 1 could be adapted for different curing processes by providing any number of additional heating zones.

Another embodiment as described in relation to FIG. 7 could be adapted depending on the curing process required. For example, the tray stack 100 could be passed between the first and second heating zones 340, 350 any number of times, varying the temperature and duration of each stage if desired.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

Although the disclosure herein refers to certain specific embodiments, it is to be understood that these embodiments are presented by way of example and not by way of limitation. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment disclosed herein. The intent of the foregoing detailed description, although discussing exemplary embodiments, is to be construed to cover all modifications, alternatives, and equivalents of the embodiments described in the present description and claims.

What is claimed is:

1. A method of forming contact lenses by curing contact lens precursor materials in molds, wherein the method comprises the following steps:
   providing amounts of a contact lens precursor material in molds of a first mold stack,
   providing an oven,
   providing an inert atmosphere in the oven, and heating the molds in the oven to cure the contact lens precursor material in the molds by:
  moving gas flow over a heating element and through the oven; and
  moving the molds between a plurality of zones that are defined at least partially by at least one wall; and
wherein the oven is operable to maintain simultaneously a first zone of the plurality of zones at a first temperature and a second zone of the plurality of zones at a second, different, temperature.

2. A method as claimed in claim 1, further comprising rotating a fan to discharge gas flow over a heating element.

3. A method as claimed in claim 1, further comprising directing the gas flow through a discharge duct and passing the gas flow through the oven.

4. A method as claimed in claim 2, further comprising directing the gas flow through a return duct and into an inlet end of the fan.

5. A method as claimed in claim 1, further comprising the step of restricting heat flow between the first zone and the second zone.

6. A method as claimed in claim 1, further comprising adjusting an opening to restrict the gas flow in a discharge duct.

7. A method as claimed in claim 1, further comprising the step of stopping the molds within the first zone or the second zone or both the first zone and the second zone.

8. A method as claimed in claim 1, further comprising moving molds of a second mold stack through the oven.

9. A method as claimed in claim 1, further comprising using a perforated plate for restricting the gas flow.

10. A method as claimed in claim 1, wherein each of the plurality of zones is defined by a different oven chamber, the chambers being in sufficient communication with each other for the molds to be moved between them.

11. A method as claimed in claim 1, wherein the oven comprising the plurality of zones is in the form of a super-oven comprising a plurality of sub-ovens, and each sub-oven defines at least one of said plurality of zones.

12. A method as claimed in claim 1, wherein a moveable wall defines at least part of a boundary between two of the plurality of zones.

13. A method as claimed in claim 1, wherein a stationary wall defines at least part of a boundary between two of the plurality of zones.

14. A method as claimed in claim 1, wherein the plurality of zones are in gas communication with each other, so that the inert atmosphere is a single inert atmosphere, extending throughout the plurality of zones.

15. A method as claimed in claim 1, wherein the oven includes a scrubber for scrubbing volatile materials from the inert atmosphere.

16. A method as claimed in claim 1, wherein the oven comprises an entrance chamber and the mold advancement system is arranged to move the molds from the entrance chamber into one zone of the plurality of zones.

17. A method as claimed in claim 16, wherein the oven comprises an automated placement device arranged to put the molds into the entrance chamber.

18. A method as claimed in claim 17, wherein the oven comprises an exit chamber and the mold advancement system is arranged to move the molds from one zone of the plurality of zones into the exit chamber.

19. A method as claimed in claim 18, wherein the oven comprises an automated placement device arranged to remove the molds from the exit chamber.

20. A method as claimed in claim 18, wherein the entrance and exit chambers are the same chamber.

21. A method as claimed in claim 1, wherein the oven includes a plurality of transport units for supporting the molds.

22. A method as claimed in claim 21, wherein at least one of the transport units includes a baffle portion arranged to form at least part of a zone wall, so that when the transport unit is in one of the zones, the zone wall acts to restrict heat flow into an adjacent zone.

23. A method as claimed in claim 22, wherein each transport unit includes a baffle portion and the baffle portion of one of the transport units is arranged to co-operate with a corresponding baffle portion on another transport unit to form at least part of a zone wall.

24. A method as claimed in claim 21, wherein at least some of the transport units are stacked vertically.

25. A method as claimed in claim 21, wherein at least two of said plurality of transport units include couplings that couple together the two transport units to form at least part of a train of said transport units.

* * * * *

UNITED STATES PATENT AND TRADEMARK OFFICE
CERTIFICATE OF CORRECTION

| | |
|---|---|
| PATENT NO. | : 8,197,725 B2 |
| APPLICATION NO. | : 12/955787 |
| DATED | : June 12, 2012 |
| INVENTOR(S) | : Hayden Atkinson et al. |

It is certified that error appears in the above-identified patent and that said Letters Patent is hereby corrected as shown below:

Title page, Item (74), in "Attorney, Agent, or Firm", in column 2, line 1, delete "O'Neil" and insert -- O'Neill --, therefor.

Title page 2, Item (56), "Other Publications", in column 2, line 13, delete "fro" and insert -- from --, therefor.

In column 3, line 32, delete "e" and insert -- the --, therefor.

In column 5, line 43, after "may" delete "be".

In column 6, line 16, after "to" insert -- the --.

In column 6, line 53, delete "than" and insert -- that --, therefor.

In column 8, line 58, after "maintaining" insert -- the --.

In column 9, line 5, after "atmosphere" delete "inert".

In column 10, line 6, delete "C." and insert -- C, --, therefor.

In column 10, line 8, delete "C." and insert -- C, --, therefor.

In column 11, line 31, delete "oven." and insert -- oven; --, therefor.

In column 11, line 33, delete "4:" and insert -- 4; --, therefor.

In column 11, line 46, delete "step" and insert -- step; --, therefor.

In column 14, line 52, delete "though" and insert -- through --, therefor.

Signed and Sealed this
Fourth Day of December, 2012

David J. Kappos
*Director of the United States Patent and Trademark Office*

CERTIFICATE OF CORRECTION (continued)
U.S. Pat. No. 8,197,725 B2

In column 14, line 53, delete "10(a):" and insert -- 10(a); --, therefor.

In column 15, line 35, delete "and or" and insert -- and/or --, therefor.

In column 15, line 59, delete "all" and insert -- wall --, therefor.

In column 17, line 60, delete "510:" and insert -- 510; --, therefor.

In column 17, line 62, delete "520:" and insert -- 520; --, therefor.

In column 19, line 9, delete "thereof" and insert -- thereof. --, therefor.

In column 21, line 39, delete "be also" and insert -- also be --, therefor.

In column 22, line 7, after "reference" insert -- to --.